United States Patent
Martin et al.

(10) Patent No.: US 9,361,046 B1
(45) Date of Patent: Jun. 7, 2016

(54) WIRELESS DATA STORAGE CHASSIS

(71) Applicant: Igneous Systems, Inc., Seattle, WA (US)

(72) Inventors: Timothy Rex Martin, Seattle, WA (US); Jeffrey Douglas Hughes, Seattle, WA (US); Kiran V. Bhageshpur, Seattle, WA (US)

(73) Assignee: Igneous Systems, Inc., Seattle, WA (US)

( * ) Notice: Subject to any disclaimer, the term of this patent is extended or adjusted under 35 U.S.C. 154(b) by 0 days.

(21) Appl. No.: 14/709,043

(22) Filed: May 11, 2015

(51) Int. Cl.
*G06F 3/06* (2006.01)
*G06F 13/40* (2006.01)

(52) U.S. Cl.
CPC .......... *G06F 3/0686* (2013.01); *G06F 13/4027* (2013.01); *G06F 2003/0697* (2013.01)

(58) Field of Classification Search
None
See application file for complete search history.

(56) References Cited

U.S. PATENT DOCUMENTS

| | | | |
|---|---|---|---|
| 4,634,929 | A * | 1/1987 | Fischer .................... 315/5.39 |
| 5,786,912 | A * | 7/1998 | Kartalopoulos ............. 398/50 |
| 5,838,891 | A | 11/1998 | Mizuno et al. |
| 6,073,209 | A | 6/2000 | Bergsten |
| 6,807,642 | B2 | 10/2004 | Yamamoto et al. |
| 7,028,154 | B2 | 4/2006 | Reeves |
| 7,035,972 | B2 | 4/2006 | Guha et al. |
| 7,133,805 | B1 | 11/2006 | Dankenbring et al. |
| 7,349,930 | B2 * | 3/2008 | Bolt |
| 7,386,796 | B1 | 6/2008 | Simpson et al. |
| 7,437,604 | B2 | 10/2008 | Davies et al. |
| 7,444,532 | B2 | 10/2008 | Masuyama et al. |
| 7,552,289 | B2 | 6/2009 | Hoch et al. |
| 7,644,148 | B2 | 1/2010 | Ranganathan et al. |
| 7,650,532 | B2 | 1/2010 | Fukui |
| 7,861,122 | B2 | 12/2010 | Cornwell et al. |
| 7,945,730 | B2 | 5/2011 | Daftardar |
| 8,046,614 | B2 | 10/2011 | Henderson et al. |
| 8,156,381 | B2 | 4/2012 | Tamura et al. |
| 8,156,382 | B1 | 4/2012 | Booth et al. |
| 8,589,655 | B2 | 11/2013 | Colgrove et al. |
| 8,719,619 | B2 | 5/2014 | Li et al. |

(Continued)

OTHER PUBLICATIONS

Official Communication for U.S. Appl. No. 14/266,603 mailed Nov. 17, 2014 (14 pages).

(Continued)

*Primary Examiner* — Hassan Kizou
*Assistant Examiner* — Tejis Daya
(74) *Attorney, Agent, or Firm* — John W. Branch; Lowe Graham Jones PLLC

(57) ABSTRACT

Various embodiments are directed to a data storage chassis for storing a plurality of non-specific storage drives, corresponding wireless controllers, and one or more radio adapters. The storage drives are operative to communicate with another network device over a network. A storage drive wirelessly communicates with other storage drives of the chassis, as well as one or more radio adapters of the chassis. The wireless controller corresponding to a storage drive is operative to wirelessly communicate with other wireless controllers corresponding to other storage drives and also with one or more radio adapters via wireless waveguides of the chassis. The one or more radio adapters are operative to communicate with other network devices external to the chassis and serve as access points to the chassis. Because the storage drives, the corresponding controllers, and the radio adapters communicate via wireless signals transmitted along waveguides, the chassis is a wireless chassis.

26 Claims, 20 Drawing Sheets

(56) References Cited

U.S. PATENT DOCUMENTS

| | | | |
|---|---|---|---|
| 2004/0205403 A1 | 10/2004 | Markow et al. | |
| 2005/0018341 A1 | 1/2005 | Brume | |
| 2005/0198194 A1* | 9/2005 | Burkey | 709/217 |
| 2005/0228943 A1 | 10/2005 | DeCenzo et al. | |
| 2006/0224917 A1 | 10/2006 | Kleiman et al. | |
| 2007/0074077 A1 | 3/2007 | Markow et al. | |
| 2008/0005595 A1 | 1/2008 | Brume | |
| 2008/0154920 A1 | 6/2008 | Guha | |
| 2008/0183927 A1* | 7/2008 | Rofougaran | 710/106 |
| 2009/0063719 A1 | 3/2009 | Honjo et al. | |
| 2010/0049822 A1 | 2/2010 | Davies et al. | |
| 2010/0049914 A1 | 2/2010 | Goodwin | |
| 2010/0153680 A1 | 6/2010 | Baum et al. | |
| 2010/0191907 A1 | 7/2010 | Ish | |
| 2010/0211335 A1 | 8/2010 | Gokita | |
| 2010/0281199 A1 | 11/2010 | Fu et al. | |
| 2011/0307721 A1 | 12/2011 | Ouchi et al. | |
| 2012/0151262 A1 | 6/2012 | Nakayama et al. | |
| 2012/0210169 A1 | 8/2012 | Coile et al. | |
| 2012/0311381 A1 | 12/2012 | Porterfield | |
| 2013/0073880 A1 | 3/2013 | Miyazaki | |
| 2013/0132759 A1 | 5/2013 | Lathrop et al. | |
| 2013/0205181 A1 | 8/2013 | Blaum et al. | |
| 2013/0219101 A1 | 8/2013 | Hansen et al. | |
| 2013/0227352 A1 | 8/2013 | Kumarasamy et al. | |
| 2013/0232289 A1 | 9/2013 | Zhong et al. | |
| 2013/0312005 A1 | 11/2013 | Chiu et al. | |
| 2013/0326269 A1 | 12/2013 | Losh et al. | |
| 2014/0047057 A1 | 2/2014 | Kuo | |
| 2014/0047300 A1 | 2/2014 | Liang et al. | |
| 2014/0068627 A1 | 3/2014 | Goh et al. | |
| 2014/0095740 A1 | 4/2014 | Ozawa | |
| 2014/0115390 A1 | 4/2014 | Coile et al. | |
| 2014/0164824 A1 | 6/2014 | Reche et al. | |
| 2014/0173306 A1 | 6/2014 | Cooper et al. | |
| 2014/0173351 A1 | 6/2014 | Afifi et al. | |
| 2014/0297038 A1 | 10/2014 | Nishioka et al. | |
| 2014/0297596 A1 | 10/2014 | Jeon et al. | |
| 2014/0317058 A1 | 10/2014 | Chang et al. | |
| 2015/0185425 A1* | 7/2015 | Gundel et al. | 455/90.2 |

OTHER PUBLICATIONS

Official Communication for U.S. Appl. No. 14/576,095 mailed Feb. 11. 2015 (16 pages).

Official Communication for U.S. Appl. No. 14/596,179 mailed Apr. 29, 2015 (37 pages).

Official Communication for U.S. Appl. No. 14/596,179 mailed May 18, 2015 (5 pages).

International Search Report and Written Opinion for Application PCT/US2015/027104 mailed Aug. 5, 2015 (12 pages).

* cited by examiner

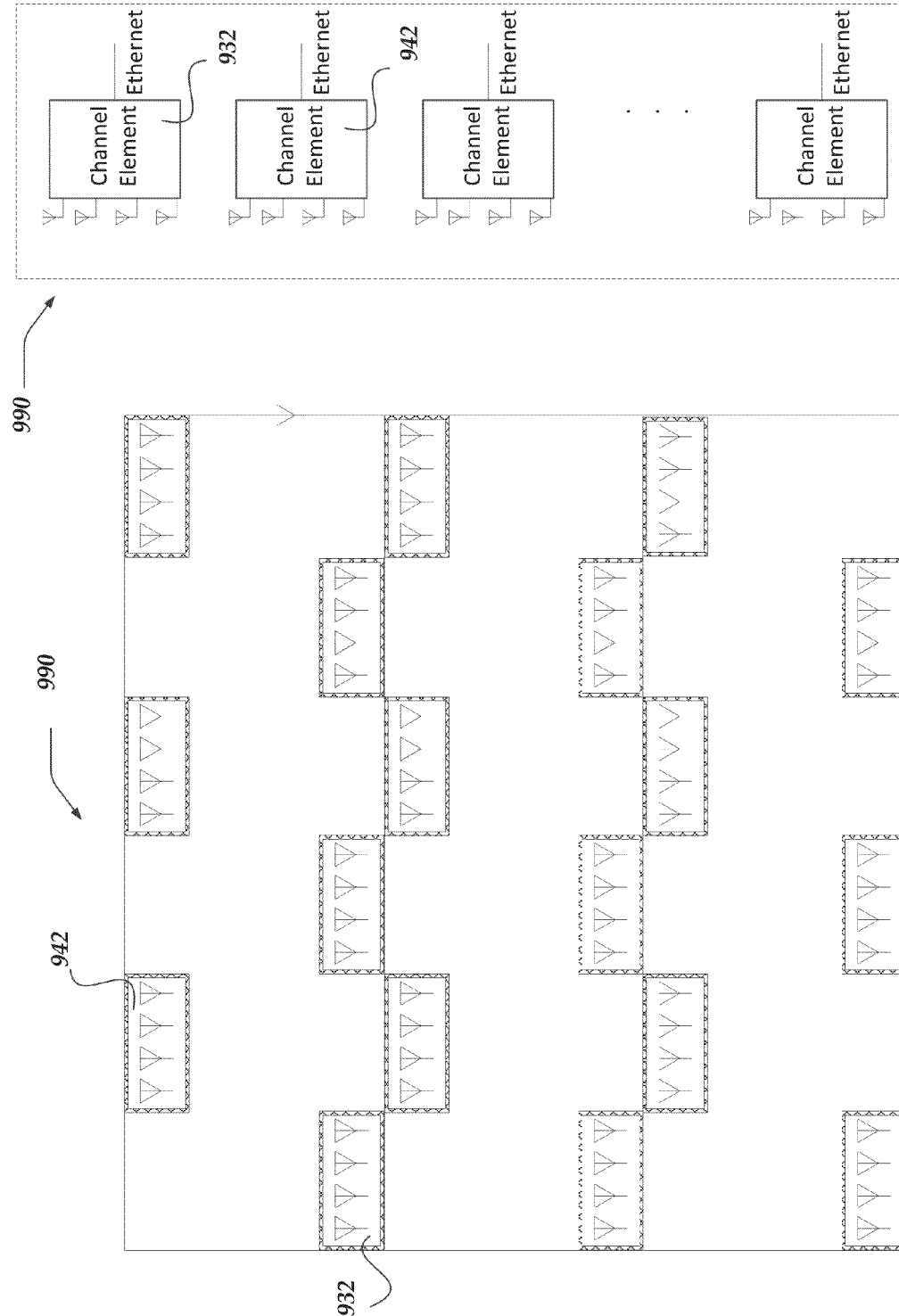

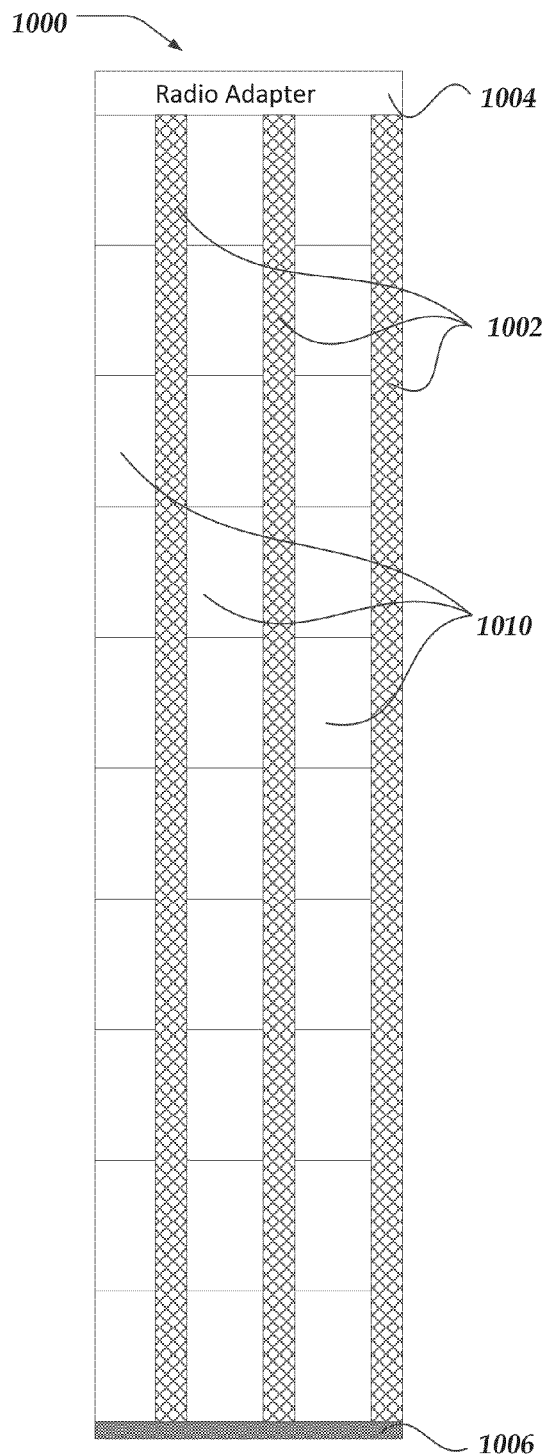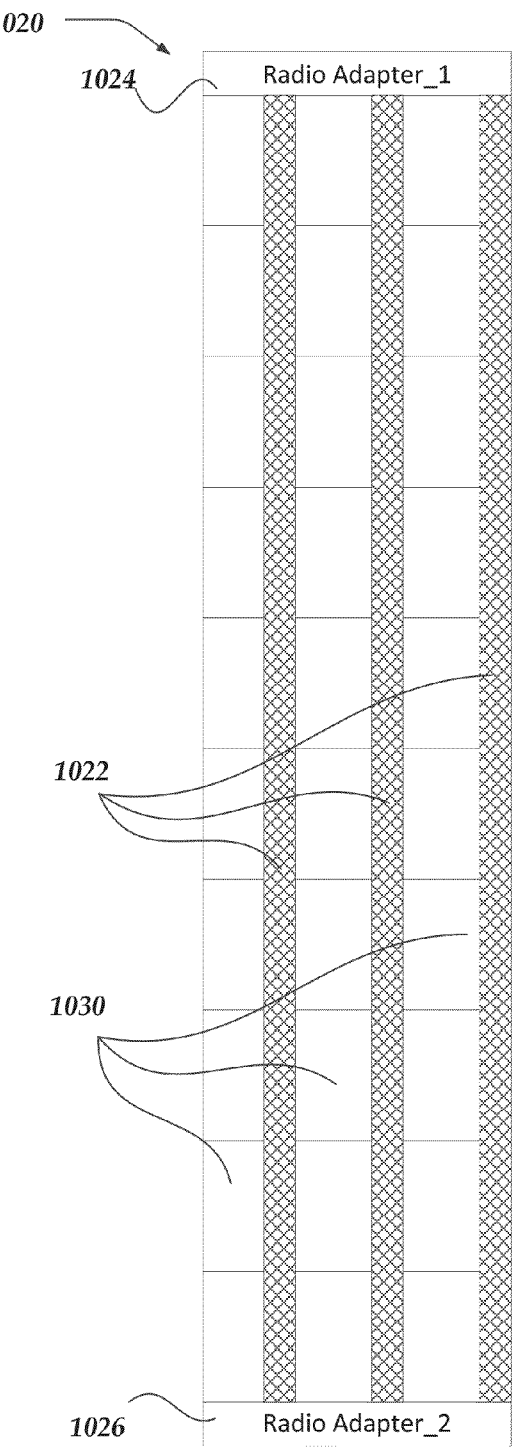
*FIG. 10A*  *FIG. 10B*

WIRELESS DATA STORAGE CHASSIS

TECHNICAL FIELD

The present invention relates generally to a multi-storage-drive data chassis that houses a plurality of non-specific storage drives, but more particularly, but not exclusively, to a wireless data storage chassis that includes radio adapters and wave guides so that together with network-addressable-storage-drive wireless controllers, the storage drives are communicatively coupled to other network devices.

BACKGROUND

The use of distributed storage systems has grown in abundance over the past few years. These systems often use a chassis that house multiple storage drives, where data can be distributed across the various storage drives. Typically, a single built-in chassis computer or stand-alone computer is used as an interface between the chassis (and accordingly each storage drive) and other network computers. This master computer generally coordinates read and write operations, and sometimes data recovery operations. However, if this master computer fails, then access to the storage drives may be drastically reduced, slowed, or even blocked to all of the drives of the chassis. Thus, it is with respect to these considerations and others that the invention has been made.

BRIEF DESCRIPTION OF THE DRAWINGS

For a better understanding of the present invention, reference will be made to the following Detailed Description, which is to be read in association with the accompanying drawings, wherein:

FIG. 9A shows a schematic view of an embodiment of a radio adapter that is operative to electromagnetically couple to a plurality of waveguides included in a wireless chassis;

FIG. 9B shows a schematic view of the plurality of channel elements included in a radio adapter;

FIG. 10A shows a front view of an embodiment of a wireless data storage chassis that is consistent with the various embodiments disclosed herein;

FIG. 10B shows a front view of an embodiment of a redundant wireless data storage chassis that is consistent with the various embodiments disclosed herein;

DETAILED DESCRIPTION OF THE INVENTION

Figure 1:
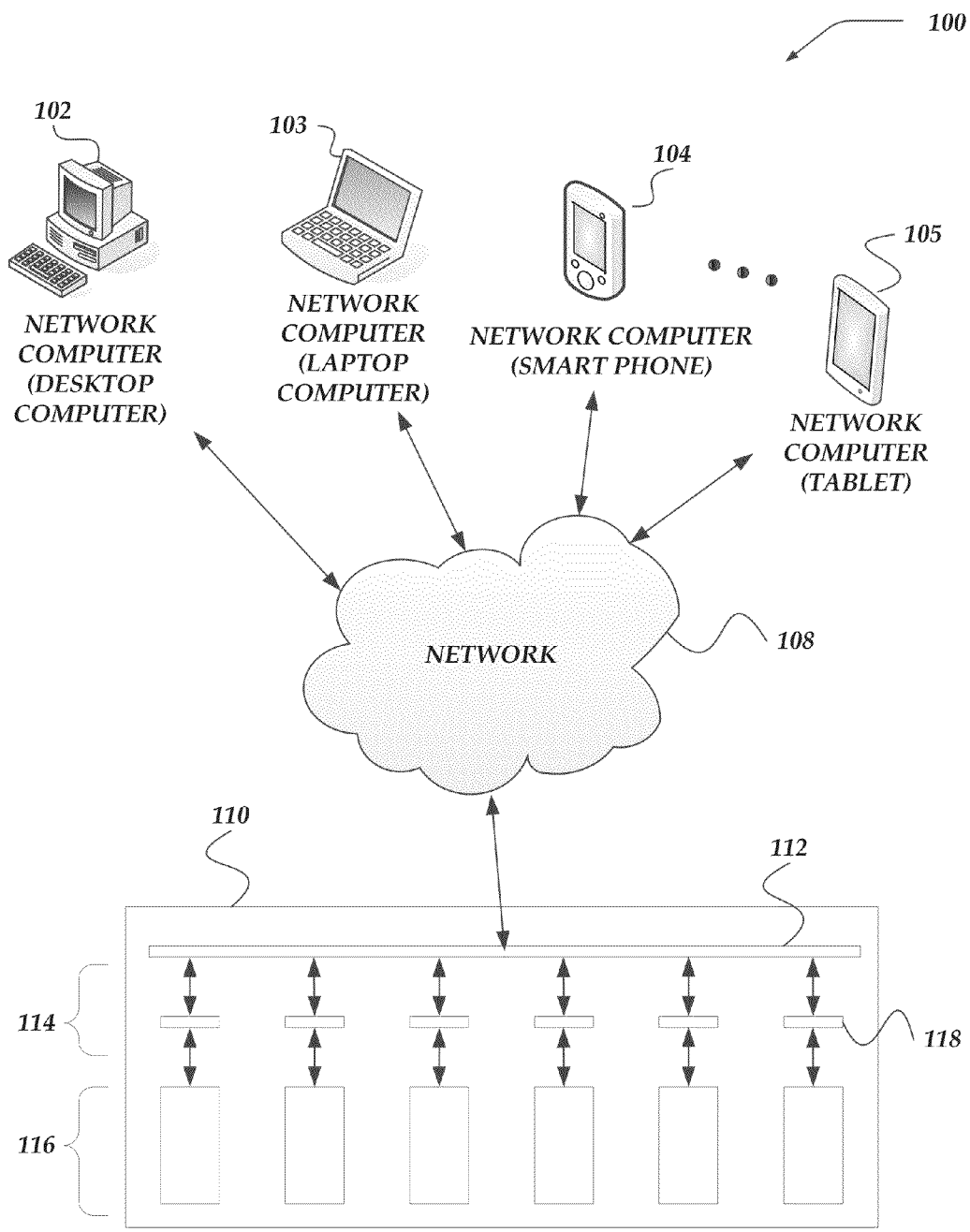
FIG. 1 is a system diagram of an environment in which embodiments of the invention may be implemented.

Various embodiments are described more fully hereinafter with reference to the accompanying drawings, which form a part hereof, and which show, by way of illustration, specific embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media, or devices. Accordingly, the various embodiments may be entirely hardware embodiments, entirely software embodiments, or embodiments combining software and hardware aspects. The following detailed description should, therefore, not be limiting.

Throughout the specification and claims, the following terms take the meanings explicitly associated herein, unless the context clearly dictates otherwise. The term "herein" refers to the specification, claims, and drawings associated with the current application. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "multi-storage-drive chassis" refers to a storage architecture that includes a chassis, backplane, and various other circuitry (e.g., power supply, a centralized chassis controller, or the like) for enabling use of a plurality of storage drives. In some embodiments, a multi-storage-drive chassis may be in a non-RAID (non-Redundant Array of Independent Disks) architecture, such as, for example, a JBOD (or "just a bunch of disks") architecture. However, embodiments are not so limited, and in other embodiments, the multi-storage-drive chassis may be in a RAID architecture.

In various embodiments, the backplane of the chassis may include a plurality of connectors that are electrically coupled to the backplane. Some aspects of the connectivity may be in parallel; power for instance. Other connector connectivity can be star connected high speed serial. These connectors may be referred to as backplane connectors. In some embodiments, each backplane connector may be referred to as a storage-drive slot (or disk slot). The backplane connectors may enable a plurality of storage drives to electrically couple with the backplane. In at least one embodiment, the plurality of storage drives may receive power through the backplane connectors.

In various embodiments, multi-storage-drive chassis may utilize storage-drive carriers or trays to enable easy insertion and removal of the storage drives to and from the chassis. The storage-drive carriers can provide easy and consistent alignment of a storage-drive's output connector and a backplane input connector.

In various embodiments, the multi-storage-drive chassis may use wireless communication to connect a plurality of storage drives to an external network. The wireless multi-storage-drive chassis embodiments may include one or more waveguides to facilitate secure and effective wireless communication with the storage drives. The one or more waveguides may be located in the chassis so that they extend from one, some, or all of the shelves of storage drives in the chassis. In preferred embodiments, at least one of the waveguides is configured and arranged to transmit wireless signals along a substantially vertical axis of transmission. For instance, the wave guides may be substantially vertical waveguides extending between the shelves of the chassis. In various embodiments, one or more channels, or cavities, in the waveguides are provided. Each channel may be formed in a waveguide having a shape that facilitates the communication of wireless signals along its length, such as a substantially circular, oval, rectangular, square, triangular, or the like shape.

In various embodiments, antennas corresponding to one or more radio adapters and one or more antennas corresponding to one or more wireless controllers for the storage drives are able to wirelessly receive and transmit wireless communication signals with each other within the waveguide. The one or more radio adapters are also configured to facilitate communication between one, some or all of the wireless controllers and at least one network and/or network device that is remote to the chassis.

In various embodiments of the wireless multi-storage-drive chassis, multiple radio adapters may be located in one or more waveguides to at least facilitate system redundancy and flexible bandwidth allocation when wirelessly communicating with one or more wireless controllers. For example, in various exemplary embodiments, two or more radio adapters may be arranged in one waveguide to provide redundant wireless communication with each wireless controller in the multi-storage-drive chassis. Also, in other exemplary embodiments, multiple radio adapters may be separately located in different waveguides or isolated portions of a waveguide to provide greater wireless communication flexibility and increased communication bandwidth with different portions of the plurality of wireless storage drive controllers in the wireless multi-storage-drive chassis. For example, in various embodiments, one portion of a plurality of wave guides may be arranged to enable wireless communication between one portion of a plurality of wireless controllers. And another different portion of the plurality of wave guides may be arranged to enable wireless communication between another different portion of the plurality of radio adapters and another different portion of the plurality of wireless controllers located in the wireless multi-storage-drive chassis. Also, in various embodiments, the one or more radio adapters may be located along the length of one or more of the waveguides and/or at one or both ends of each waveguide.

Additionally, in various embodiments, one or more termination plates for wireless signals within a wave guide may be arranged at one or both ends of a waveguide to prevent reflections and standing waves of wireless communication signals within the waveguide. In at least one embodiment, a termination plate is positioned to partition or subdivided one or more waveguides into multiple, electromagnetically isolated waveguide portions. Also, the interior surface of one or more channels in a waveguide may be irregular to support MIMO spatial multiplexing operation based on multipath inducing geometry within the waveguide's channel. For example, the waveguide's interior surface may include symmetrical and/or non-symmetrical ridges, angles, shapes, folds, corrugations, or protuberances that are placed at symmetrical and/or non-symmetrical locations along the interior surface of the waveguide's channel. Furthermore, in at least one embodiment, one or more obstacles are positioned within the transmitting cavity of a waveguide to enable spatial multiplexing.

In various embodiments, the wireless multi-storage-drive chassis is not limited for use with waveguides to provide wireless communication. Instead, the chassis may be provided without waveguides and employ one or more radio adapters that can wirelessly communicate with one or more wireless controllers separate from a waveguide. Further, in various embodiments, the chassis may be provided with waveguides for a portion of storage drives having wireless controllers, and wired connections for other storage drives having controllers with a second connector.

In various embodiments, the types of wireless communication protocols employed by the radio adapters and the wireless controllers may be a standard protocol or one of its variants, for example, WiFi (IEEE 802.11), Bluetooth (IEEE 802.15.1), WiMax (IEEE 802.16), WiMax MIMO, WiMax MISO, ZigBee (IEEE 802.15.4), MiWi (IEEE 802.15.4), or the like. The wireless communication signals may also be communicated with a modified standard wireless protocol, and/or a proprietary wireless protocol.

In some embodiments, a chassis includes one or more remote communication interfaces. The communication interfaces are operative to provide communication with at least one network and/or network device that is remote to the chassis. The remote communication interfaces may be in communication with the radio adapters. For instance, a remote communication interface of the chassis may be operative to communicate (via wire or wirelessly) with an external communication interface of a radio adapter. In at least one embodiment, at least one remote communication interface is included in a radio adapter. A remote communication interface of the chassis may be integrated with a external communication interface of a radio adapter.

As used herein, the term "radio adapter" refers to an electronic component, device, computer, and the like, that is located in a wireless multi-storage-drive chassis and provides wireless communication with one or more wireless storage drive controllers. Also, in various embodiments, the radio adapter enables communication between the chassis' storage devices (i.e., each wireless controller) and at least one network and/or network device that is remote to the chassis. An external communication interface of the radio adapter may at least partially enable communication with the network device. As discussed above, an external communication interface of a radio adapter may be in communication with, or integrated with, a remote communication interface of the chassis to provide communication over a network with remotely located network computers.

Also, in various embodiments, the communication with the at least one network and/or remote network device may be based on Ethernet, or the like. Additionally, in various embodiments, the radio adapter may employ a fiber optic connection, or some other high bandwidth connection, to communicate with the at least one network and/or remote network device, or the like. In at least one embodiment, the communication between the radio adapter and the at least one network and/or remote network device may be a wireless communication.

In various embodiments, the radio adapter may include one or more antennas that enable wireless communication with one or more wireless controllers and/or one or more radio adapters that are at least located in the wireless multi-storage-drive chassis. In various embodiments, the radio adapter may be configured to wirelessly communicate through a channel or cavity in a waveguide with one or more wireless controllers and/or one or more other radio adapters. In various embodiments, the radio adapter may include one or more antennas for enabling wireless communication with one or more wireless controllers and/or one or more other radio adapters that communicate outside of a waveguide.

As used herein, the term "storage drive" refers to a device for storing data. The various embodiments described herein can utilize most typical, non-specific, or general storage drive on the market (i.e., the storage drive itself does not need to include or be modified to include any circuitry, components, or the like to perform the various embodiments). Storage drives may include hard disk drives (HDD), solid state drives (SSD), optical drives, or the like.

In various embodiments, storage drives may include a housing that has two ends, a top, a bottom, and two sides. In various embodiments, a back end of the storage-drive housing may include a storage-drive connector. In at least one of various embodiments, the back end of the housing may include peripheral edges (e.g., the perimeter edges of the back end of the storage-drive housing).

Storage drives can come in many different form factors, such as, for example, 3.5 inch, 2.5 inch, 1.8 inch, 5.25 inch, 8 inch, or the like. It should be understood that the actual dimensions of the storage drive (including the housing and/or storage-drive connector) may be different than the form factor nomenclature based on industry standards. Some multi-storage-drive chassis may support only one form factor, while other multi-storage-drive chassis may support multiple form factors (e.g., backplane connectors may be compatible with storage drives having different factors and the storage-drive carriers may be adaptable for different form factors). Although the specification is primarily described in terms of storage drives having a 3.5 inch form factor, embodiments are not so limited. But, rather, other types of storage drives, form factors, and/or chassis may be employed.

Along with different form factors, storage drives can include different connectors for connecting to a multi-storage-drive-chassis backplane. These connectors may be referred to as storage-drive connectors and may be compatible with the backplane connectors. A storage-drive connector may be a SAS connector, SATA connector, universal serial bus (USB), firewire (or IEEE 1394), thunderbolt, PATA (Parallel Advanced Technology Attachment) connector, SCSI connector, Fibre Channel (FC) connector, Enhanced Integrated Drive Electronics (EIDE) connector, or the like.

Storage drives may have different power consumption profiles depending on various states of the storage drive, type of storage drive, or the like. Some of the different states of a storage drive may be an initial start-up power state; an idle state, an initial access state, and a sustained read/write state. The initial start-up power state may be when an initial amount of power is provided to the storage drive for the storage drive to provide basic communication with other devices. The idle state may be while the storage drive is awaiting a read/write request. The initial access state may be an initial amount of power required to make a read or write of the drive (e.g., an initial power required to start spinning the disk of a HDD). The sustained read/write state may be while a storage drive is fulfilling a read or write request after the initial read/write state.

As used herein, the term "controller" or "controller computer" refers to a computer or physical device that is separate from a typical/non-specific/general storage drive and separate from a multi-storage-drive chassis, but can be electrically coupled between an individual storage drive and the chassis backplane.

Briefly, the controller can accept data in a storage drive supported protocol through a storage-drive connector and wirelessly provide the data to other controllers or to a radio adapter. Accordingly, such controllers are wireless controllers. The controllers convert the accepted data into a supported protocol, such as any wireless protocol for output through a wireless interface. The wireless interface is enabled to transmit the data, via a waveguide included in a wireless data storage chassis. Similarly, the controller can accept data in the wireless protocol through the waveguide and convert it to a storage drive supported protocol for output through the storage-drive connector to the storage drive. In various embodiments, each controller effectively makes each separate storage drive individually network accessible by other controllers and/or network computers.

In various embodiments, the wireless controller may include one or more wireless interfaces with antennas that enable communication with one or more radio adapters and/or one or more other wireless controllers located in a wireless multi-storage-drive chassis. The wireless interfaces may be removed and exchanged and/or reprogrammed to accommodate at least a wireless communication protocol employed by a corresponding radio adapter. The wireless controller may be configured to wirelessly communicate through a channel in a waveguide, and/or outside of a waveguide, with one or more other wireless controllers and/or one or more radio adapters. The wireless controller may include one or more antennas for wirelessly communicating. Also, the wireless controller may include a connector for receiving power from a wireless multi-storage-drive chassis. In various embodiments, the wireless controller enables communication between the chassis' storage devices and one or more radio adapters over a high bandwidth wireless connection, e.g., a WiFi 802.1 1ad. In at least one embodiment, the wireless interfaces receive and transmit data outside of a waveguide.

In various embodiments, the controller may have a first connector, a wireless interface, a processor, memory, and other peripheral circuitry. In various embodiments, the processor and memory (and other peripheral circuitry) may be mounted on a circuit board, such as a printed circuit board (PCB). The first connector is positioned on the side of the PCB that faces a storage drive. The processor, memory, and periphery circuitry may be mounted on either side of the PCB.

The first connector may be a connector that can couple with a storage-drive connector. The wireless interface electromagnetically couples the controller to the waveguide. The first connector may be selected based on the storage-drive connector, so that the first connector and the storage-drive connector are compatible (e.g., the storage-drive connector may be a male connector, which can mate with a female first connector on the controller). In at least one of various embodiments, the first connector may be a SATA connector (but other connectors may be employed). In various embodiments, the types of connectors that may be utilized for the first connector may include, for example, SAS connector, SATA connector, universal serial bus (USB), firewire (or IEEE 1394), thunderbolt, PATA (Parallel Advanced Technology Attachment) connector, SCSI connector, Fibre Channel (FC) connector, Enhanced Integrated Drive Electronics (EIDE) connector, or the like.

In some embodiments, the controller board may be a universal board that can accept different types of first connectors and/or wireless interfaces. In at least one of various embodiments, a user may be enabled to affix the first connector and/or the wireless interface to the controller board. For example, assume a user has a multi-storage-drive chassis that includes one or more waveguides to electromagnetically couple a plurality of wireless controllers and one or more radio adapters. Further assume that the user has three storage drives with SATA connectors and three storage drives with USB connectors. In this example, the user can put together six different controllers, three controllers with a SATA connector as first connector and a wireless interface to transmit and receive wireless signals via the waveguide, and three other controllers with a USB connector as the first connector and a wireless interface to transmit and receive wireless signals via the waveguide. This universal controller board can enable a user to use virtually any storage drive (with a controller-supported connector type) with virtually any wireless multi-storage-drive chassis, regardless of the storage drive and chassis having connectors that are compatible with each other.

In various embodiments, the controller may have dimensions that fit into the form factor shadow of the storage drive. As described in more detail herein, a circuit board of the controller may have a shape that fits within the dimensions of a lateral cross-section of the storage drive. Similarly, the overall size of the controller may be determined such that the controller and storage drive—when coupled together—is compatible with a drive carrier for the multi-storage-drive chassis. In various embodiments, "fitting into the form factor shadow of the storage drive" may refer to a physical shape of the controller being operative to fit adjacent to a correspondingly coupled storage drive connector and occupy less space than is bounded by peripheral edges of an end of a separate housing of a storage drive coupled to the storage drive connector. In some embodiments, this physical shape of the controller may fit into the peripheral edges of a lateral-cross second of the storage drive.

As described in more detail herein, a wireless controller may be operative to control/manage a single storage drive. So, unlike a master computer that would control/manage a plurality of storage drives, each controller individually controls/manages its own corresponding individual storage drive. Although, in various embodiments, controllers may wirelessly communicate with each other to coordinate and perform tasks between a plurality of storage drives. In some embodiments, controllers can wirelessly communicate locally (without accessing the chassis interface for communication with external/remote devices) with other controllers through the one or more waveguides included in the wireless chassis via wireless protocols.

In various embodiments, a controller can individually determine one or more power-up sequences and/or manage the voltage and/or power supplied to its corresponding storage drive (i.e., the storage drive that the controller is coupled to). In other embodiments, a plurality of controllers can coordinate with each other to schedule power-up sequences for a plurality of storage drives (e.g., to minimize the power spike effects of powering up multiple storage drives at the same time).

In other embodiments, the controller may monitor various performance characteristics of its corresponding drive (e.g., power consumption, temperature, response time/latency, or the like) to provide comprehensive storage drive analytics and diagnostics at the individual drive level. This type of monitoring can allow a controller to identify that its corresponding drive may be about to fail (e.g., changes in power consumption, temperatures above a threshold, increased latency, or the like), and coordinate with other controllers (or an administrator) to backup the potentially failing drive's data, halt future write operations to potentially failing drive, or the like.

It should be noted that these examples of wireless controller functionality are for illustration purposes and should not be construed as limiting, and that each controller may perform additional tasks and/or actions at the individual storage drive level and/or coordinate with each other to perform tasks and/or actions across a plurality of storage drives.

As used herein, the term "waveguide" refers to any structure that is configured and arranged to guide or otherwise enable the transmission or propagation of an electromagnetic ("EM") wave. The direction of the wave's transmission or propagation is substantially defined by characteristics of the waveguide. In various embodiments, a waveguide is configured and arranged to transmit wireless communication signals between one or more wireless interfaces of a plurality of wireless controllers housed within a chassis. Furthermore, a waveguide may be configured and arranged to transmit wireless communication signals between one or more wireless interfaces of a wireless controller and a wireless interface of a radio adapter, where at least one of the wireless controller or the radio adapter is housed within a wireless chassis. Thus, a waveguide may be a wireless waveguide.

In various embodiments, a waveguide includes a cavity, and the wireless signals are transmitted along an airspace within the cavity. The internal walls or surfaces of the cavity may be electrically conductive. In at least one embodiment, a waveguide is a conducting pipe or pipe segment. The lateral cross-sectional shape of the pipe may be of any shape, including but not limited to oval, circular, square, rectangular, triangular, or any other such shape.

As described herein, a waveguide's interior surfaces may include symmetrical and/or non-symmetrical ridges, angles, shapes, folds, corrugations, or protuberances that are placed at symmetrical and/or non-symmetrical locations along the interior surface of the waveguide's channel. Such structures on the interior surfaces of a waveguide are operative to create multiple signal paths or noise in signals transmitted along the airspace in the cavity. Such multiple signal paths are employed to support MIMO or MIMO-like multiplexing of the airspace within the cavity. Structures, such as obstacles, wave splitters, reflectors, or the like may be positioned within the cavity to provide the multiple signal paths. Such obstacles may include conductive surfaces that are configured and arranged to reflect incident EM waves.

Characteristics of the waveguide, including a cross-sectional shape and/or lateral dimensions may be based on various characteristics of the EM waves to be transmitted. For instance, a lateral cross-sectional shape and/or a lateral dimension of the waveguide may be based on the range of frequencies or wavelengths of the signals to be transmitted. In preferred embodiments, one or more characteristics of a waveguide are based on enabling the transmission and guidance of a wireless signal consistent with a wireless protocol or standard, such as, but not limited to WiFi (IEEE 802.11), Bluetooth (IEEE 802.15.1), WiMax (IEEE 802.16), WiMax MIMO, WiMax MISO, ZigBee (IEEE 802.15.4), MiWi (IEEE 802.15.4), or the like. In at least one embodiment, a waveguide is a Radio Frequency ("RF") waveguide because the waveguide is operative to transmit EM waves within the RF portion of the EM spectrum.

Waveguides may confine the EM waves to within the waveguide. In a preferred embodiment, a waveguide enables total or near-total internal reflection (from the internal conductive walls of the cavity) of the waves within the waveguide. As the EM wave propagates along the direction of waveguide, the transmission is not substantially attenuated. Thus, the power loss of a signal within the waveguide is minimal. Furthermore, the signal is not substantially detectable outside of the waveguide, i.e. the waveguide is not a "leaky" waveguide. Accordingly, a signal within the waveguide is detectable within the cavity, but is not practically detectable outside the cavity. A device, such as a wireless interface of a network device, is said to be "electromagnetically coupled" to a waveguide if the device is operative to receive, transmits, or otherwise detect a wireless signal within the waveguide.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to a data storage chassis for storing a plurality of non-specific storage drives, corresponding wireless controllers, and one or more radio adapters. At least a portion of the storage drives are operative to communicate with another portion of the storage drives and with another network device over a network. A storage drive of the chassis wirelessly communicates with other storage drives of the chassis, as well as one or more radio adapters of the chassis. The wireless controller corresponding to a specific storage drive is operative to wirelessly communicate with other wireless controllers corresponding to other storage drives and also one or more radio adapters via waveguides of the chassis. The one or more radio adapters are operative to communicate with other network devices external to the chassis. Accordingly, the one or more radio adapters may serve as access points or wireless switches to the chassis. Because the storage drives, the corresponding controllers, and the radio adapters communicate via wireless signals, the chassis is a wireless chassis.

In various embodiments, a wireless chassis does not include, or at least includes less of: wires, Ethernet switches, switching fabrics, because the communication between the storage drives and external network devices is at least partially enabled by wireless: waveguides, controllers, and radio adapters. Accordingly, the storage density of a wireless chassis is increased. Additionally, the cost of a wireless chassis is reduced due to the reduced wiring costs and the ready availability of wireless communication hardware. Also due to the reduced wiring and hardware requirements, a wireless chassis is simpler and easier to install and maintain.

A wireless chassis may include an increased bandwidth. Furthermore, the bandwidth may be dynamically allocated during the operation of the wireless chassis based on real time or near-real time operating conditions or requirements. In various embodiments, the bandwidth of a wireless chassis is increased by multiplexing at least one of: a frequency space within the chassis, an airspace within the chassis, or a geometry of the chassis. For instance, a frequency space may be multiplexed by at least transmitting multiple wireless signals within a single waveguide, wherein frequency channels of the multiple signals are distributed among a frequency band. Thus, a single waveguide may be multiplexed into a plurality of frequency channels.

An airspace within the chassis may be multiplexed by providing employing multiple transmitting and multiple receiving antennas to employ the multipath wave propagation within a single waveguide, such as a MIMO or MIMO-like spatial multiplexing. In at least one embodiments, individual channels within a single waveguide are defined by walls are other structures internal to the waveguides. Additionally, the geometry of the chassis may be multiplexed by providing separate and distinct waveguides within the chassis. In some embodiments, a single waveguide is multiplexed into two separate waveguide portions by a termination plate, or other such structure. Such multiplexing may be dynamically adjusted to meet the real time or expected bandwidth needs of the chassis.

More specifically, various embodiments are directed to an apparatus or system, such as a wireless data storage chassis, for storing a plurality of non-specific storage drives. The plurality of storage drives are operative to communicate over a network. Furthermore, a bandwidth for wireless communication between the plurality of storage drives and another network device separate from the chassis is increased by multiplexing at least one of: a frequency space, an airspace, or a geometry of a chassis or apparatus.

Various embodiments of the apparatus include a housing. The housing houses or otherwise contains the plurality of storage drives, one or more radio adapters, one or more wireless waveguides, and one or more remote communication interfaces. Each of the storage drives includes one or more wireless controllers. The radio adapters include wireless interfaces and communication interfaces. The radio adapters perform at least one of: multiplexing frequencies of wireless signals communicated in an airspace between the one or more radio adapters and the one or more wireless controllers or multiplexing wireless signals communicated between the one or more radio adapters and the one or more wireless controllers based on one or more characteristics of the airspace.

The wireless waveguides include an internal cavity for the airspace. The internal cavity may guide the transmission of the wireless signals between the wireless controllers and the wireless interfaces of the radio adapters. The remote communication interfaces provide communication over the network with one or more remotely located network computers. The remote communication interfaces are in communication with the external communication interfaces of the radio adapters.

Illustrative Operating Environment

FIG. 1 shows components of one embodiment of an environment in which various embodiments of the invention may be practiced. Not all of the components may be required to practice the various embodiments, and variations in the arrangement and type of the components may be made without departing from the spirit or scope of the invention. As shown, system 100 of FIG. 1 may include wireless multi-storage-drive chassis 110, network computers 102-105, and network 108.

Network computers 102-105 may communicate with multi-storage-drive chassis 110 via network 108. Network 108 may be configured to couple network computers with other computing devices, including network computers 102-105, multi-storage-drive chassis 110, other networks, or the like. In various embodiments, information communicated between devices may include various kinds of information, including, but not limited to, processor-readable instructions, client requests, server responses, program modules, applications, raw data, control data, video data, voice data, image data, text data, or the like. In some embodiments, this information may be communicated between devices using one or more technologies and/or network protocols.

In some embodiments, network 108 may include various wired networks, wireless networks, or any combination thereof. In various embodiments, network 108 may be enabled to employ various forms of communication technology, topology, computer-readable media, or the like, for communicating information from one electronic device to another. For example, network 108 can include—in addition to the Internet—LANs, WANs, Personal Area Networks (PANs), Campus Area Networks (CANs), Metropolitan Area Networks (MANs), direct communication connections (such as through a USB port), or the like, or any combination thereof.

In various embodiments, communication links within and/or between networks may include, but are not limited to, twisted wire pair, optical fibers, open air lasers, coaxial cable, plain old telephone service (POTS), wave guides, acoustics, full or fractional dedicated digital lines (such as T1, T2, T3, or T4), E-carriers, Integrated Services Digital Networks (ISDNs), Digital Subscriber Lines (DSLs), wireless links (including satellite links), or other links and/or carrier mechanisms known to those skilled in the art. Moreover, communication links may further employ any of a variety of digital signaling technologies, including without limit, for example, DS-0, DS-1, DS-2, DS-3, DS-4, OC-3, OC-12, OC-48, or the like. In some embodiments, a router (or other intermediate network device) may act as a link between various networks—including those based on different architectures and/or protocols—to enable information to be transferred from one network to another. In other embodiments, network computers and/or other related electronic devices could be connected to a network via a modem and temporary telephone link. In essence, the network may include any communication technology by which information may travel between computing devices.

Network 108 may, in some embodiments, include various wireless networks, which may be configured to couple various portable network devices, remote computers, wired networks, other wireless networks, or the like. Wireless networks may include any of a variety of sub-networks that may further overlay stand-alone ad-hoc networks, or the like, to provide an infrastructure-oriented connection for at least network computers 103-105. Such sub-networks may include mesh networks, Wireless LAN (WLAN) networks, cellular networks, or the like. In at least one of the various embodiments, the system may include more than one wireless network.

Network 108 may employ a plurality of wired and/or wireless communication protocols and/or technologies. Examples of various generations (e.g., third (3G), fourth (4G), or fifth (5G)) of communication protocols and/or technologies that may be employed by the network may include, but are not limited to, Global System for Mobile communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000 (CDMA2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), time division multiple access (TDMA), Orthogonal frequency-division multiplexing (OFDM), ultra wide band (UWB), Wireless Application Protocol (WAP), user datagram protocol (UDP), transmission control protocol/Internet protocol (TCP/IP), any portion of the Open Systems Interconnection (OSI) model protocols, session initiated protocol/real-time transport protocol (SIP/RTP), short message service (SMS), multimedia messaging service (MMS), or any of a variety of other communication protocols and/or technologies. In essence, the network may include communication technologies by which information may travel between network computers 102-105, multi-storage-drive 110, other computing devices not illustrated, other networks, or the like.

In various embodiments, at least a portion of the network may be arranged as an autonomous system of nodes, links, paths, terminals, gateways, routers, switches, firewalls, load balancers, forwarders, repeaters, optical-electrical converters, or the like, which may be connected by various communication links. These autonomous systems may be configured to self-organize based on current operating conditions and/or rule-based policies, such that the network topology of the network may be modified.

At least one embodiment of network computers 102-105 is described in more detail below in conjunction with network computer 200 of FIG. 2. Briefly, in some embodiments, network computers 102-105 may be configured to communicate with multi-storage-drive chassis 110 to enable distributed storage. In some embodiments, network computers 102-105 may communicate with individual controllers (e.g., controllers 114) for each storage drive associated with multi-storage-drive chassis 110 (e.g., storage drives 116) to perform reads and writes of data, access information and/or analytics, or the like. In various embodiments, network computers 102-105 may be remote and/or separate from chassis 110 and controllers 114.

In some embodiments, at least some of network computers 102-105 may operate over a wired and/or wireless network (e.g., network 108) to communicate with other computing devices and/or multi-storage-drive chassis 110. Generally, network computers 102-105 may include computing devices capable of communicating over a network to send and/or receive information, perform various online and/or offline activities, or the like. It should be recognized that embodiments described herein are not constrained by the number or type of network computers employed, and more or fewer network computers—and/or types of network computers—than what is illustrated in FIG. 1 may be employed.

Devices that may operate as network computers 102-105 may include various computing devices that typically connect to a network or other computing device using a wired and/or wireless communications medium. Network computers may include portable and/or non-portable computers. In some embodiments, network computers may include client computers, server computers, or the like. Examples of network computers 102-105 may include, but are not limited to, desktop computers (e.g., network computer 102), personal computers, multiprocessor systems, microprocessor-based or programmable electronic devices, network PCs, laptop computers (e.g., network computer 103), smart phones (e.g., network computer 104), tablet computers (e.g., network computer 105), cellular telephones, display pagers, radio frequency (RF) devices, infrared (IR) devices, Personal Digital Assistants (PDAs), handheld computers, wearable computing devices, entertainment/home media systems (e.g., televisions, gaming consoles, audio equipment, or the like), household devices (e.g., thermostats, refrigerators, home security systems, or the like), multimedia navigation systems, automotive communications and entertainment systems, integrated devices combining functionality of one or more of the preceding devices, or the like. As such, network computers 102-105 may include computers with a wide range of capabilities and features. In some embodiments, network computers 102-105 may be referred to as remote computers, because they access and/or store data on a different computer/device, such as multi-storage-drive chassis 110. In some embodiments, multi-storage-drive chassis 110 may be maintained at a location that is separate from network devices 102-105 (e.g., cloud computing/storage that utilize distributed storage systems).

Network computers 102-105 may access and/or employ various computing applications to enable users of network computers to perform various online and/or offline activities. Such activities may include, but are not limited to, generating documents, gathering/monitoring data, capturing/manipulating images, managing media, managing financial information, playing games, managing personal information, browsing the Internet, or the like. In some embodiments, network computers 102-105 may be enabled to connect to a network through a browser, or other web-based application.

Network computers 102-105 may further be configured to provide information that identifies the network computer. Such identifying information may include, but is not limited to, a type, capability, configuration, name, or the like, of the network computer. In at least one embodiment, a network computer may uniquely identify itself through any of a variety of mechanisms, such as an Internet Protocol (IP) address, phone number, Mobile Identification Number (MIN), media access control (MAC) address, electronic serial number (ESN), or other device identifier.

Multi-storage-drive chassis 110 may include backplane 112 and may be configured to house a plurality of separate storage drives, such as storage drives 116, which may include more or less devices than what is illustrated in the figure. In some embodiments, each storage drive may utilize (e.g., be fastened to) a storage carrier or tray (not shown) for insertion into the chassis. However, in some embodiments, the storage drives may be affixed directly to the chassis. As described herein, a separate controller (e.g., wireless controllers 114) may be coupled to each separate storage drive and the combination of the storage drive and controller may be coupled to backplane 112. Each of wireless controllers 114 may provide a separately addressable network interface for each of storage drives 116.

In various embodiments, chassis 110 may be configured and/or modified to provide aired and/or wireless communication access to backplane 112. In at least one embodiment, backplane 112 may provide wireless communication access to each of controllers 114 through one or more waveguides that wirelessly couples the controllers 114 to a radio adapter. In some embodiments, chassis 110 may include an Ethernet port and/or interface component for connecting chassis 110 to network 108.

Wireless controllers 114 may directly communicate with network computers 102-105. In various embodiments, each of controllers 114 may convert data received from its corresponding storage drive 116 into an Ethernet protocol and communicated to network computers 102-105 via backplane 112 and network 108. Similarly, each controller may convert data received from network computers 102-105 (via network 108 and the Ethernet connection supported by backplane 112) into a storage drive protocol for accessing its own corresponding storage drive.

Since storage drives 116 can be of any typical/non-specific/general storage drive/agnostic, each of controllers 114 may perform different types of data protocol conversions depending on the type storage drive that it is coupled with. In this way, each storage drive can be individually addressable and network computers 102-105 can individually access each separate storage drive 116 via an Ethernet protocol without having to utilize a centralized/master controller—either a chassis controller or a standalone computer that centrally manages access to each storage drive 116. So, in various embodiment, each separate controller (of controllers 114), and thus each separate storage drive, is individually addressable and can be individually accessed by network devices 102-105.

In various embodiments, controllers 114 may wirelessly communicate with each other via a waveguide enabled connection of backplane 112 to employ various storage drive management actions, monitoring actions, or the like. So in some embodiments, controllers 114 may communicate with each other—independent of a chassis controller or other primary/main/master/coordinator computer—to perform various actions (some of which may be done in parallel), including, but not limited to, data reads, data writes, data recovery, or the like.

For example, in some embodiments, the controllers may communicate with each other to perform distributed data storage actions among a plurality of storage drives. In one non-limiting example, network computer 102 may provide a write request to controller 118 (in some embodiments, this request may go through a load balancer or other routing device). Controller 118 may work together with the separate controllers 114 to coordinate the write request across one or more of storage drives 116 (even if the network computer is unaware of the other controllers and/or storage drives). In this example, controller 118 may coordinate with the other controllers of controllers 114 to determine which controller/storage drives will store what data. Since each controller 114 is network accessible (e.g., IP addressable), in some embodiments, network computer 102 may be able to individually access each storage drive 116 and indicate which storage drives will store what data.

Similarly, the controllers may communicate with each other to recover lost data. For example, assume there are 20 storage drives that are logically separated into four clusters, and each drive is coupled to a controller, as described herein. If one of the drives in a single cluster fails and the other drives in the same cluster are configured to and able rebuild the lost data of the failed drive, then the controllers associated with the drives in that cluster can coordinate the rebuild of the lost data, while the other 15 drives continue to perform data reads, writes, or the like.

In some other embodiments, controllers 114 may manage and coordinate power utilization of storage drives 116. In various embodiments, power consumption management and/or power management of a storage drive may include enabling and/or disabling various features of a storage drive. For example, a controller can manage the power consumption of its correspondingly coupled storage drive by providing different commands (e.g., through the command set) to the storage drive to enable/disable various features of the storage drive. In other embodiments, power management may include switching the power rails (e/g/. +3.3V, +5V and +12V) on and off.

In various embodiments, controllers 114 may communicate with each other to coordinate a schedule for powering up storage drives 116. In some embodiments, each controller 114 may be operative to determine parameters and/or capabilities of its corresponding storage drive. This determination may be based on a type of connector that is coupled to the storage drive (i.e., the first connector), previously stored power consumption profile of the storage drive, drive identifier, or the like.

Based on the parameters and/or capabilities of each storage drive in the chassis, controllers 114 may determine an efficient way of powering up the storage drives to reduce spikes in power consumption by the storage drives (i.e., each controller may determine various power-up sequences for its correspondingly coupled storage drive). In particular, mechanical drives (e.g., HDDs) may have an initial spike in power consumption when they turn on due to the electrical properties of powering up the motor to drive the disk. This power consumption can be compared to that of SSDs, which typically is a more step function when the drive is powered up.

Since each controller can manage the power supplied to its corresponding storage drive, and since there is no need for the drives to be of a uniform type (or model, or from a same manufacturer), the controllers as a group can determine and employ a power-up schedule that can allow one or more of the storage drives to power up before other storage drives are powered up. For example, in some embodiments, each of the mechanical drives (e.g., HDD) may be power up before the SSDs on the same chassis. Similarly, each the power up of each drive may be slightly staggered to further reduce the issues that can arise from a spike in power consumption. By optimizing the schedule for powering storage drives 116.

Similarly, a controller can individually and dynamically adjust the power of its corresponding drive at any given time. In this way, each controller can individually or collectively monitor the temperature of the various drives and adjust their power individually.

This type of drive-specific power control can enable a controller to reduce a drive's power—e.g., if the drive has a temperature above a threshold in an attempt to give the drive time to cool down. In other embodiments, a controller can increase or decrease the power supplied to its correspondingly coupled storage drive based on trade-offs between power consumption, speed of accessing data, regularity or frequency of access requests, or the like. In yet other embodiments, a plurality of controllers can coordinate to reduce power consumption on a per drive basis across a plurality of storage drives. So, in some embodiments, the controller may individually monitor and adjust the power supplied to an individual storage drive or may work collectively to manage/adjust the power supplied to the plurality of storage drives.

This type of control at the drive level can allow for reduced power consumption during various times of the day. For example, if some storage drives are idle for a predetermined time and the current time is at a peak price for energy (e.g., dollars per kilowatt used), then the controllers for those storage drives may individually reduce the power supplied to those storage drives—while other storage drives (that are accessed more recently) are maintained at a higher power. Therefore, a user of the chassis can save money on energy costs without greatly affecting performance.

Since each separate storage drive is managed by a separate controller, each controller can provide individualized management and/or monitoring of a corresponding storage drive. For example, in some embodiments, a controller can monitor power consumption, temperature, or other performance characteristics of the coupled storage drive and provide those monitored analytics to one of network computers 102-105 or to another controller. In at least one such embodiment, if a controller determines that its corresponding storage drive is operating at a temperature above a given threshold, the controller can reduce the power consumption of the drive or power it down completely (e.g., until the drive temperature falls below another threshold value).

In other embodiments, the controller may identify that its corresponding drive is exhibiting performance characteristics of a failing drive (e.g., extra power consumption, overheating, excessive latency (e.g., above a time threshold) while performing a read/write operation, or the like), then the controller can notify the other controllers (or one or more of network devices 102-105) that its drive may be about to fail. Once notified of the possible failure, the controllers can take steps to anticipate the failure. Such anticipation may include employing other controllers to write to other non-failing drives, initiate copying of the failing drive to a spare drive (that also has a corresponding controller), or the like.

In various other embodiments, the combined/coupled storage drive and controller may utilize hot swap features of chassis 110.

In some embodiments, controllers 114 may cooperatively coordinate with each other in a peer-to-peer architecture to control/manage operations of each correspondingly coupled storage drive 116, as described herein. In other embodiments, controllers 114 may cooperatively coordinate storage-drive-operation control/management with each other as more of a server-to-peer architecture, where one of controllers 114 may operate as a master controller and one or more of the other controllers of controllers 114 may operate as slave controllers.

In at least one such architecture, the slave controllers may provide information (e.g., storage-drive characteristics, performance parameters, or the like) to the master controller. The master controller can determine storage-drive power-up sequences and/or schedules, identify potentially failing storage drives, coordinate backup and/or recovery of a potentially failing (or already failed) storage drive, or the like, as described herein. Based on these determinations, the master controller may provide instructions to one or more of the slave controllers for managing their correspondingly coupled storage drives. For example, the master controller may provide separate instructions to each slave controller, which may separately indicate when and/or how a slave controller is to power-up its correspondingly coupled storage drive (noting that the master controller may also have a correspondingly coupled storage drive that may be managed/controlled in conjunctions with the other storage drives). In other embodiments, the controllers may communicate information amongst each other without directly accessing, managing, or otherwise controlling the storage drives.

In various other embodiments, a network computer (e.g., one of network computers 102-105, which may be remote to chassis 110) and controllers 114 may operate in a server-to-peer architecture to control/manage operations of one or more storage drives 116 in chassis 110 (or storage drives in multiple chassis)—similar to that which is described above. In at least one such embodiment, the network computer may operate as a master network computer and controllers 114 may operate as slave controllers. In various embodiments, the network computer (e.g., a master network computer) may coordinate and/or instruct each of controllers 114 (e.g., slave controllers) to control/manage operations of each correspondingly coupled storage drive 116. For example, controllers 114 may provide information (e.g., storage-drive characteristics, performance parameters, or the like) to the master network computer. The master network computer can determine storage-drive power-up sequences and/or schedules, identifying potentially failing storage drives, coordinate backup and/or recovery of a potentially failing (or already failed) storage drive, or the like, as described herein. Based on these determinations, the master network computer may provide instructions to one or more of controllers 114 for managing their correspondingly coupled storage drives. For example, the master network computer may provide separate instructions to each controller, which may separately indicate when and/or how a controller is to power-up a correspondingly coupled storage drive.

It should be noted that these architectures are not to be construed as exhaustive or limiting, but rather, other architectures may be employed in accordance with embodiments described herein. For example, in various embodiments, network computers 102-105 and/or controllers 114 may operate in various different architectures including, but not limited to, a peer-to-peer architecture, peer-to-server architecture, server-to-server architecture, or the like, to control/manage the operations of one or more of storage drives 116. As described herein, the control/management of storage-drive operations may include, but is not limited to determining storage-drive power-up sequences and/or schedules, identifying potentially failing storage drives, coordinate backup and/or recovery of a potentially failing (or already failed) storage drive, or the like.

Illustrative Network Computer

Figure 2:
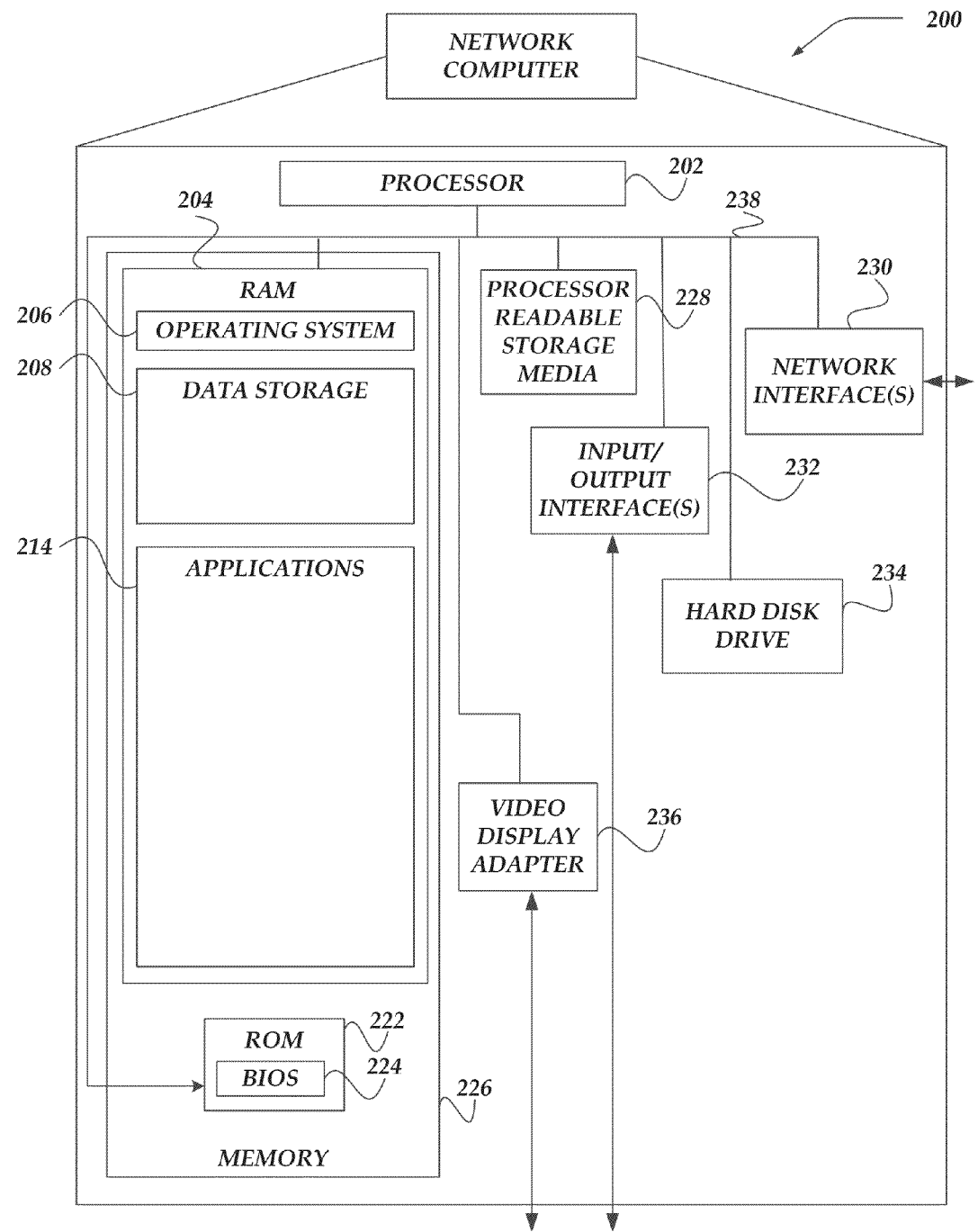
FIG. 2 shows an embodiment of a network computer that may be included in a system such as that shown in FIG. 1.

FIG. 2 shows one embodiment of a network computer 200 that may include many more or less components than those shown. The components shown, however, are sufficient to disclose an illustrative embodiment for practicing the invention. Network computer 200 may represent, for example network computers 102-105 of FIG. 1, and/or other network devices.

Network computer 200 may be configured to operate as a server, client, peer, a host, or other computing device. In general, network computer 200 may be a desktop computer, mobile computer (e.g., laptop computers, smart phones, tablets, or the like), server computer, or any other network computer that can communicate through a network to access and/or store data at a remote/secondary location (i.e., multi-storage-drive chassis 110 of FIG. 1).

Network computer 200 may include processor 202, processor readable storage media 228, network interface 230, an input/output interface 232, hard disk drive 234, video display adapter 236, and memory 226, all in communication with each other via bus 238. In some embodiments, processor 202 may include one or more central processing units.

Network interface 230 includes circuitry for coupling network computer 200 to one or more networks, and is constructed for use with one or more communication protocols and technologies including, but not limited to, protocols and technologies that implement any portion of the OSI model, GSM, CDMA, time division multiple access (TDMA), UDP, TCP/IP, SMS, MMS, GPRS, WAP, UWB, WiMax, SIP/RTP, EDGE, W-CDMA, LTE, UMTS, OFDM, CDMA2000, EV-DO, HSDPA, or any of a variety of other wireless communication protocols. Network interface 230 is sometimes known as a transceiver, transceiving device, or network interface card (NIC). In various embodiments, network interface unit 230 may enable network computer 200 to access and/or store data on one or more storage drives associated with a multi-storage-drive chassis, such as multi-storage-drive chassis 110 of FIG. 1.

Network computer 200 may comprise input/output interface 232 for communicating with external devices, such as a keyboard, or other input or output devices not shown in FIG. 2. Input/output interface 232 can utilize one or more communication technologies, such as Universal Serial Bus (USB), infrared, WiFi, WiMax, Bluetooth™, wired technologies, or the like.

Memory 226 may include various types of storage technologies, which may include various types of non-volatile storage, volatile storage, or a combination thereof. Examples of memory 226 may include, but are not limited to Random Access Memory (RAM) (e.g., RAM 204), dynamic RAM (DRAM), static RAM (SRAM), Read-only Memory (ROM) (e.g., ROM 222), Electrically Erasable Programmable Read-only Memory (EEPROM), flash memory, hard disk drives, optical drives, magnetic computer storage devices, tape drives, floppy disk drives, or other processor-readable storage media. In some embodiments, memory 226 may include processor-readable transitory or non-transitory storage media. In various embodiments, memory 226 may include one or more caches.

Memory 226 may be utilized to store information, such as, but not limited to, processor-readable instructions (also referred to as computer-readable instructions), structured and/or unstructured data, program modules, or other data/information. In various embodiments, some of the data/information stored by memory 226 may be used by processor 202 to execute and/or perform actions. In some embodiments, at least some of the data/information stored by memory 226 may also be stored on another component of network computer 200, such as, but not limited to, process-readable storage media 228. Processor-readable storage media 228 may include one or more storage technologies, such as, but not limited to, those storage technologies described above for memory 226. In various embodiments, processor-readable storage media 228 may also be referred to as computer-readable storage media, processor-readable storage devices, and/or computer-readable storage devices. In some embodiments, process-readable storage media 228 may be removable or non-removable from network computer 200.

Memory 226 may include system firmware, such as BIOS 224, which may store instructions for controlling low-level operations of network computer 200. Memory 226 may also store operating system 206 for controlling the operation of network computer 200. In some embodiments, operating system 206 may include a general purpose operating system (e.g., UNIX, LINUX™, Windows™, OSX™, Windows Phone™, iOS™, Android™, or the like). The operating system functionality may be extended by one or more libraries, modules, plug-ins, or the like.

Memory 226 may include one or more data storage 208, which can be utilized by network computer 200 to store, among other things, applications 214 and/or other data. For example, data storage 208 may also be employed to store information that describes various capabilities of network computer 200. The information may then be provided to another device based on any of a variety of events, including being sent as part of a header during a communication, sent upon request, or the like. Data storage 208 may also include a database, text, spreadsheet, folder, file, or the like, that may be configured to maintain and store user account identifiers, user profiles, email addresses, IM addresses, and/or other network addresses; or the like. Data storage 208 may further include program code, data, algorithms, and the like, for use by a processor, such as processor 202 to execute and perform actions. In one embodiment, at least some of data store 208 might also be stored on another component of network computer 200, including, but not limited to processor-readable storage media 228, hard disk drive 234, or the like.

Applications 214 may include computer executable instructions that, when executed by network computer 200, transmit, receive, and/or otherwise process instructions and data. Examples of application programs may include, but are not limited to, calendars, search programs, email client applications, IM applications, SMS applications, contact managers, task managers, transcoders, schedulers, database programs, word processing programs, encryption applications, security applications, spreadsheet applications, games, and so forth.

A mobile computer may include a browser application that is configured to receive and to send web pages, web-based messages, graphics, text, multimedia, and the like. The mobile computer's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Applications 214 may also include an application that can enable a user to individually access each separate controller (e.g., controllers 114 of FIG. 1) associated with each storage drive (e.g., storage drives 116 of FIG. 1) through a network. So, in some embodiments, each controller (i.e., each storage drive) may be individually network addressable by network computer 200. This access can enable a user to employ control (e.g., power/voltage changes, temperature and other drive performance monitoring, or the like) over each individual drives within a multi-storage-drive chassis.

In various embodiments, network computer 200 may operate as a master network computer to cooperatively coordinate with at least one of controllers (e.g., controllers 114 of FIG. 1) to control/manage operations of one or more storage drives coupled to the controllers. In at least one such embodiment, network computer 200 may perform at least a portion of the operations described herein.

Illustrative Wireless Controller Computer

Figure 3A:
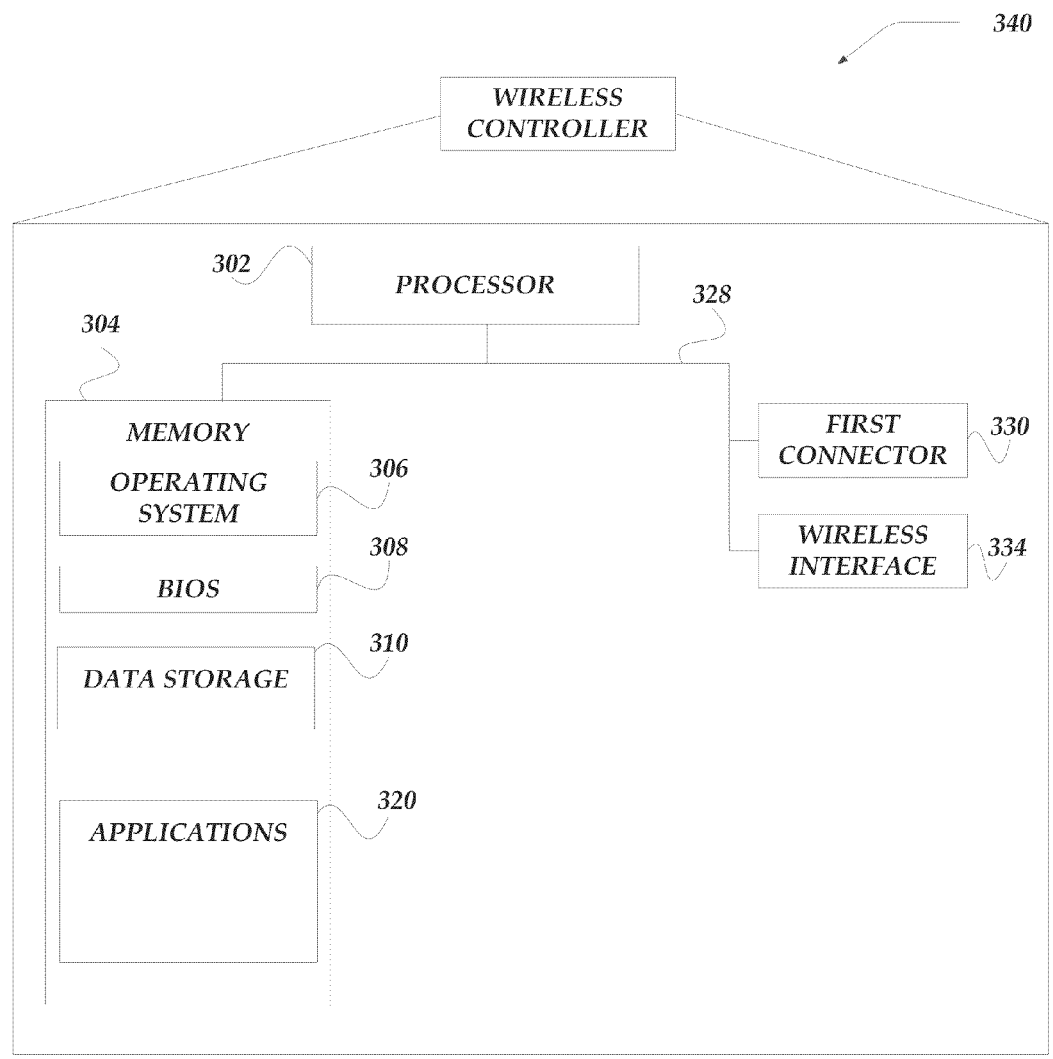
FIG. 3A show embodiment of a wireless controller that may be including in a system such as that shown in FIG. 1.

FIG. 3A shows one embodiment of wireless controller 340 that may include many more or less components than those shown. The components shown, however, are sufficient to disclose an illustrative embodiment for practicing the invention. Wireless controller 340 may represent, for example controllers 114 of FIG. 1.

Controller 340 may be configured to enable individualized communication between a single storage drive (e.g., storage drives 116 of FIG. 1) and one or more network devices (e.g., network computers 102-105 of FIG. 1). It should be understood that although a single controller manages/controls a single storage drive, a plurality of controllers can work together to provide centralized management of a plurality of storage drives.

Controller 340 may include processor 302, first connector 330, second connector 332, and memory 304, all in communication with each other via bus 328. In some embodiments, processor 302 may include one or more central processing units. First connector 330 may be a connector configured to couple with and/or accept a storage-drive connector. In at least one embodiment, first connector 330 may be a SATA connector—although other storage-drive-compatible connectors may be utilized, as described herein. Wireless interface 334 may include one or more antennas for communicating wireless signals with one or more other wireless controllers or one or more Radio Adapters. The wireless communication signals may be communicated with a standard wireless protocol, modified standard wireless protocol, and/or a proprietary wireless protocol.

Memory 304 may include various types of storage technologies, which may include various types of non-volatile storage, volatile storage, or a combination thereof. Examples of memory 304 may include, but are not limited to Random Access Memory (RAM), dynamic RAM (DRAM), static RAM (SRAM), Read-only Memory (ROM), (Electrically Erasable Programmable Read-only Memory (EEPROM), flash memory, or other processor-readable storage media. In some embodiments, memory 304 may include processor-readable transitory or non-transitory storage media. In various embodiments, memory 304 may include one or more caches.

Memory 304 may be utilized to store information, such as, but not limited to, processor-readable instructions (also referred to as computer-readable instructions), structured and/or unstructured data, program modules, or other data/information. In various embodiments, some of the data/information stored by memory 304 may be used by processor 302 to execute and/or perform actions.

Memory 304 may include system firmware, such as BIOS 308, which may store instructions for controlling low-level operations of controller 340. Memory 304 may also store operating system 306 for controlling the operation of controller 340. In some embodiments, operating system 306 may include a general purpose operating system (e.g., UNIX, LINUX™, or the like) or a customized operating system. The operating system functionality may be extended by one or more libraries, modules, plug-ins, or the like.

Memory 304 may include one or more data storage 310, which can be utilized by controller 300 to store, among other things, applications 320 and/or other data. Data storage 310 may further include program code, data, algorithms, and the like, for use by a processor, such as processor 302 to execute and Data storage 310 may be employed to store information associated with a storage drive that is connected to controller 340, such as, for example, a history of temperatures, voltages, utilization, or the like. Memory 304 may also be utilized to store network traffic information to enable communication with other devices, such as network computers 102-105 of FIG. 1 or other controllers (e.g., controllers 114 of FIG. 1). Applications 320 may include various applications for managing a storage drive, including, for example, power scheduling/management, diagnostic recording and assessment tools, or the like. In any event, controller 340 may be configured to employ various embodiments, combinations of embodiments, processes, or parts of processes, as described herein.

Illustrative Radio Adapter Computer

Figure 3B:
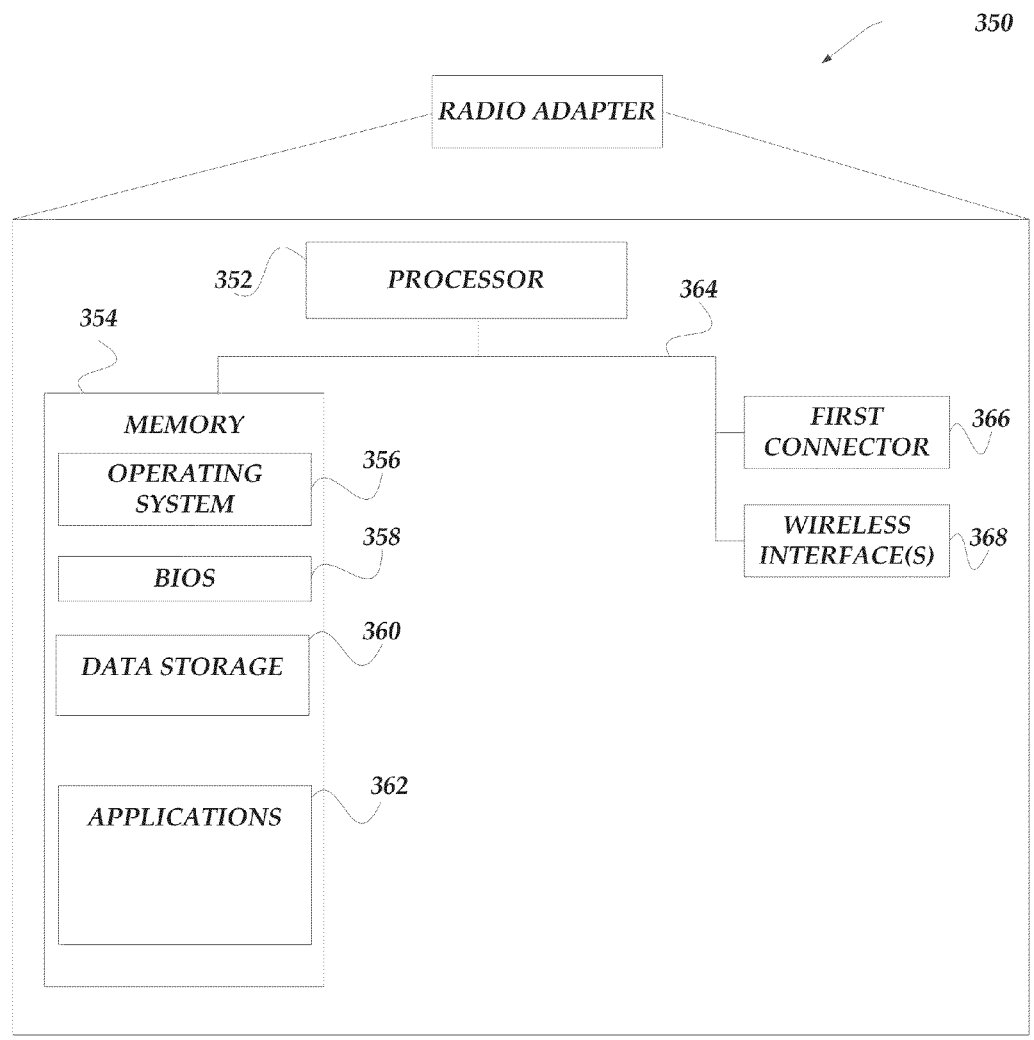
FIG. 3B shows an embodiment of a radio adapter.

FIG. 3B shows one embodiment of radio adapter 350 that may include many more or less components than those shown. The components shown, however, are sufficient to disclose an illustrative embodiment for practicing the invention. Radio Adapter 350 may represent, for example Radio Adapter 634 of FIG. 6B.

Radio Adapter 350 may be configured to enable individualized communication between wireless controller 340 and one or more network devices (e.g., network computers 102-105 of FIG. 1). It should be understood that although a single radio adapter may be employed, a plurality of radio adapters can work together to provide redundancy and flexible bandwidth to access a plurality of storage drives.

Radio adapter 350 may include processor 352, first connector 366, wireless interface 368, and memory 354, all in communication with each other via bus 364. In some embodiments, processor 352 may include one or more central processing units. First connector 366 may be a connector configured to couple to a remote network via a high bandwidth connection. An external communication interface of radio adapter 250 may include first connector 366. In at least one embodiment, first connector 366 may be a fiber optic connector—although other high bandwidth connectors may be utilized. Wireless interface 368 may include one or more antennas for communicating wireless signals with one or more wireless controllers and/or one or more other Radio Adapters. The wireless communication signals may be communicated with a standard wireless protocol, modified standard wireless protocol, and/or a proprietary wireless protocol.

Memory 354 may include various types of storage technologies, which may include various types of non-volatile storage, volatile storage, or a combination thereof. Examples of memory 354 may include, but are not limited to Random Access Memory (RAM), dynamic RAM (DRAM), static RAM (SRAM), Read-only Memory (ROM), Electrically Erasable Programmable Read-only Memory (EEPROM), flash memory, or other processor-readable storage media. In some embodiments, memory 354 may include processor-readable transitory or non-transitory storage media. In various embodiments, memory 354 may include one or more caches.

Memory 354 may be utilized to store information, such as, but not limited to, processor-readable instructions (also referred to as computer-readable instructions), structured and/or unstructured data, program modules, or other data/information. In various embodiments, some of the data/information stored by memory 354 may be used by processor 352 to execute and/or perform actions.

Memory 354 may include system firmware, such as BIOS 358, which may store instructions for controlling low-level operations of radio adapter 350. Memory 354 may also store operating system 356 for controlling the operation of radio adapter 350. In some embodiments, operating system 356 may include a general purpose operating system (e.g., UNIX, LINUX™, or the like) or a customized operating system. The operating system functionality may be extended by one or more libraries, modules, plug-ins, or the like.

Memory 354 may include one or more data storage 360, which can be utilized by controller 300 to store, among other things, applications 362 and/or other data. Data storage 360 may further include program code, data, algorithms, and the like, for use by a processor, such as processor 352 to execute and Data storage 360 may be employed to store information associated with accessing a network and/or a network device that is remote, managing communication with one or more wireless controllers, and managing communication with one or more other radio adapters. Memory 354 may also be utilized to store network traffic information to enable communication with other devices, such as network computers 102-105 of FIG. 1 or other radio adapters and wireless controllers. Applications 362 may include various applications for managing communication, or the like. In any event, radio adapter 350 may be configured to employ various embodiments, combinations of embodiments, processes, or parts of processes, as described herein.

Illustrative Wireless Data Storage Chassis

Figure 4:
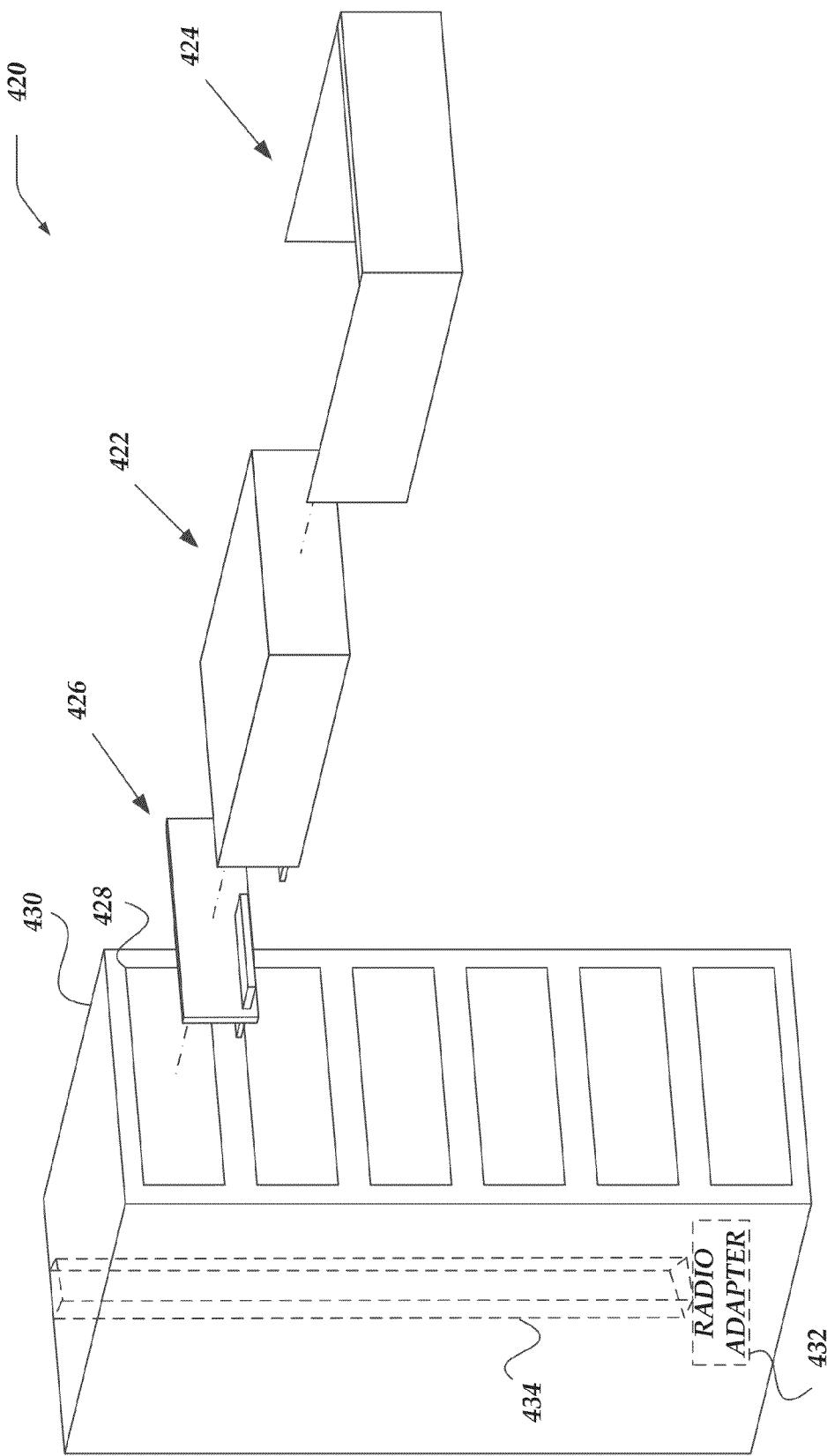
FIG. 4 illustrates an exploded perspective view of a multi-storage-drive wireless chassis, a storage-drive carrier, a storage drive, a radio adapter, a waveguide, and a wireless controller in accordance with embodiments described herein.

FIG. 4 illustrates an exploded perspective view of a wireless multi-storage-drive chassis, a storage-drive carrier, a storage drive, a radio adapter, a waveguide, and a wireless controller in accordance with embodiments described herein. System 420 may include wireless multi-storage-drive chassis 430 and storage-drive carrier 424. Wireless multi-storage drive chassis 430 may be an example of a JBOD or other chassis that can support a plurality of storage drives. In various embodiments, multi-storage-drive chassis 430 may include one or more radio adapters 432 and waveguide 434. In various embodiments, the radio adapters may provide communication between wireless controllers and/or from the chassis to other networks.

In some embodiments, storage-drive carrier 424 may be an embodiment of a storage-drive carrier disclosed in U.S. patent application Ser. No. 14/596,179 filed on Jan. 13, 2015, entitled "NETWORK AQDDRESSABLE STORAGE CONTROLLER WITH STORAGE DRIVE PROFILE COMPARISON," which is incorporated by reference in its entirety. Wireless controller 426 may be embodiment of wireless controller 340 of FIG. 3A. As illustrated, wireless controller 426 may be coupled to a back of storage drive 422. This combination of devices may be fastened to storage drive carrier 424. The combined carrier 424, drive 422, and wireless controller 426 may be inserted into slot 428 of chassis 430 in accordance with use instructions of chassis 430 for inserting a carrier into slot 428. Once inserted, wireless controller 426 may wirelessly communicate via a channel in waveguide 434 with radio adapter 432 and other wireless controllers and/or radio adapters coupled to waveguide 434.

Figure 5:
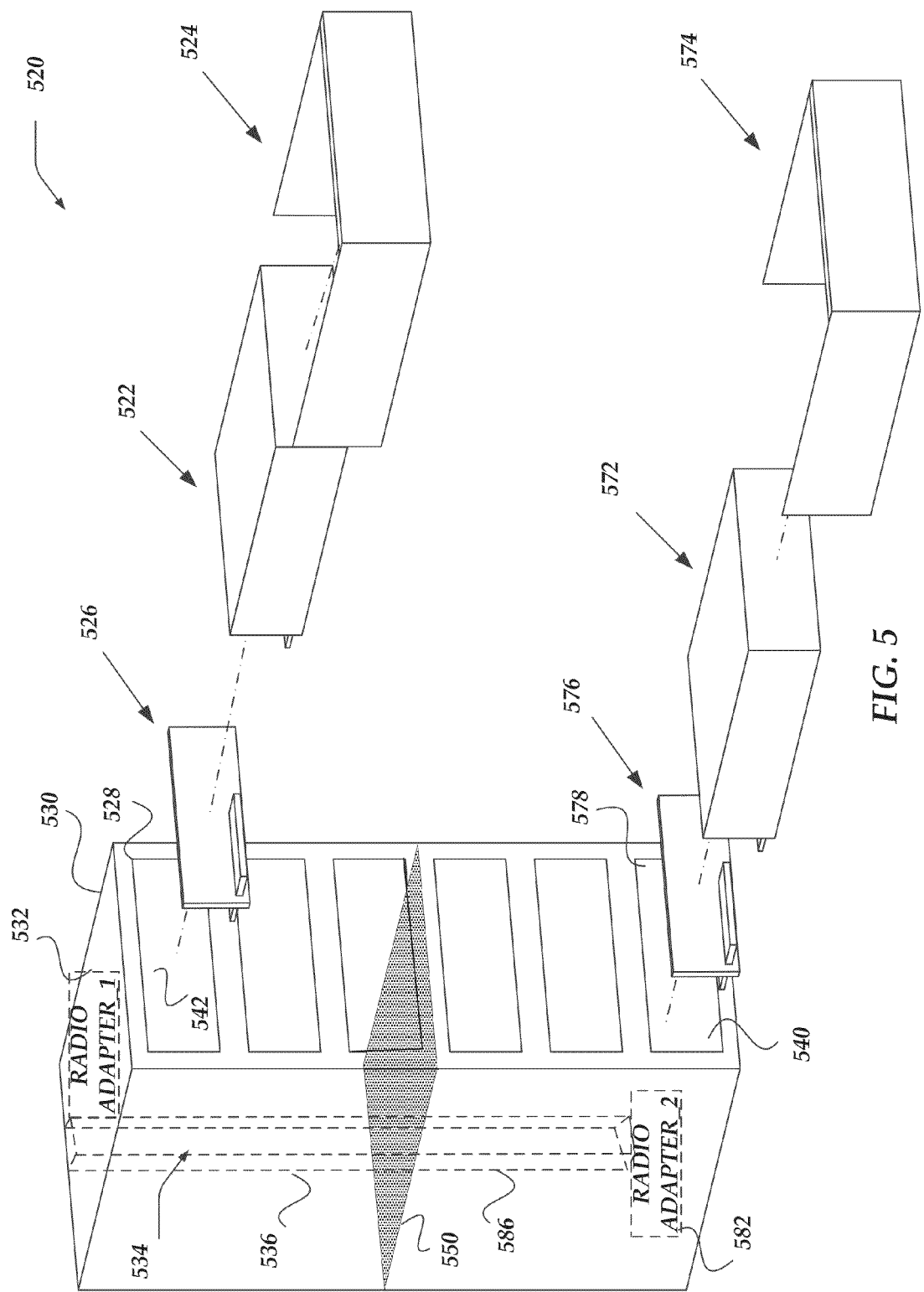
FIG. 5 illustrates an exploded perspective view of another embodiment of a wireless chassis that includes a waveguide bisected by a termination plate and two radio adapters electromagnetically isolated from one another by the termination plate, in accordance with embodiments described herein.

FIG. 5 illustrates an exploded perspective view of another embodiment of a wireless chassis that includes a waveguide bisected by a termination plate and two radio adapters electromagnetically isolated from one another by the termination plate, in accordance with embodiments described herein. System 520 includes wireless multi-storage-drive chassis 530. In various embodiments, wireless chassis 530 includes a plurality of shelves, such as a lowermost shelf 540 and an uppermost shelf. As shown, the plurality of shelves are preferably distributed along a substantially vertical direction. As discussed further below, each of the plurality of shelves may be configured and arranged to receive one or more storage drives, such as first storage drive 522 or second storage drive 572, and corresponding wireless controllers, such as first wireless controller 526 or second wireless controller 576.

System 520 includes a first storage-drive carrier 524, the first storage drive 522, and a first wireless controller 526 received in a first slot 528. As shown, the first slot may be positioned within a shelf, such as uppermost shelf 542. As discussed in greater detail throughout, including at least in the context of FIGS. 7 and 8, each shelf may be configured and arranged to receive a plurality of tiled configurations, wherein each tiled configuration includes a plurality of storage drives and corresponding wireless controllers. For instance, as shown in a preferred, but non-limiting embodiment, in FIG. 7, tiled configuration 700 includes four storage drives and a corresponding wireless controller for each of the four storage drives.

Referring back to FIG. 5, system 520 includes a second storage-drive carrier 574, a second storage drive 572, and a second wireless controller 576 received in a second slot 578 positioned within the lowermost shelf 540. Second slot 578 is vertically below first slot 528. Although now shown, storage drives and corresponding wireless controllers may be positioned in the other shelves between the lowermost shelf 540 and the uppermost shelf 542.

System 520 also includes a first radio adapter 532, a second radio adapter 582, and a waveguide 534. Waveguide 534 is bisected by a termination plate 550 to form a first waveguide portion 536 and a second waveguide portion 586. The first waveguide portion 536 is vertically above the termination plate 550 and the second waveguide portion 586 is vertically below the termination plate 550. Accordingly, the termination plate 550 electromagnetically isolates the first waveguide portion 536 from the second waveguide portion 586. The termination plate 550 has effectively multiplexed the geometry of chassis 530 by subdividing waveguide 534 into separate and distinct waveguides 534/586. Each of waveguide or electromagnetically isolated waveguide portions that operative to transmit separate and distinct wireless signals simultaneously, increasing a total communication bandwidth of chassis 530.

Although not shown, wireless chassis may include additional waveguides that are substantially vertical waveguides and also bisected by termination plate 550, further multiplexing the geometry of chassis 530. In addition to isolating waveguide portions, termination plate 550 prevents reflections and standing waves of wireless communication signals within each of the isolated waveguide portions 536 and 586. In at least one embodiment, a terminating structure, such as a conductor, is placed internal to the cavity and along the length of waveguide 534. Such a structure is configured and arranged to subdivide the cavity of waveguide 534 into separate and distinct waveguide channels or airspaces, providing further multiplexing of the geometry and enhancing the communication bandwidth of chassis 530.

First wireless controller 526 is operative to wirelessly communicate, via the first waveguide portion 536, with the first radio adapter 532 and other wireless controllers and/or radio adapters electromagnetically coupled to the first waveguide portion 536. For instance, first wireless controller 526 may communicate with other wireless controllers positioned on any shelf that is vertically above termination plate 550 and communicatively coupled to at least one of first waveguide portion 536 or first radio adapter 532.

Likewise, second wireless controller 576 is operative to wirelessly communicate, via the second waveguide portion 586, with the second radio adapter 582 and other wireless controllers and/or radio adapters electromagnetically coupled to the second waveguide portion 586. Note that due to the termination plate 550, first and second wireless controllers 526/576 cannot directly wirelessly communicate with each other via waveguide 534. Rather, the first and second controllers 526/576 may communicate via another communication route, such as, but not limited to, a wired connection between first and second radio adapters 532/582.

Figure 6:
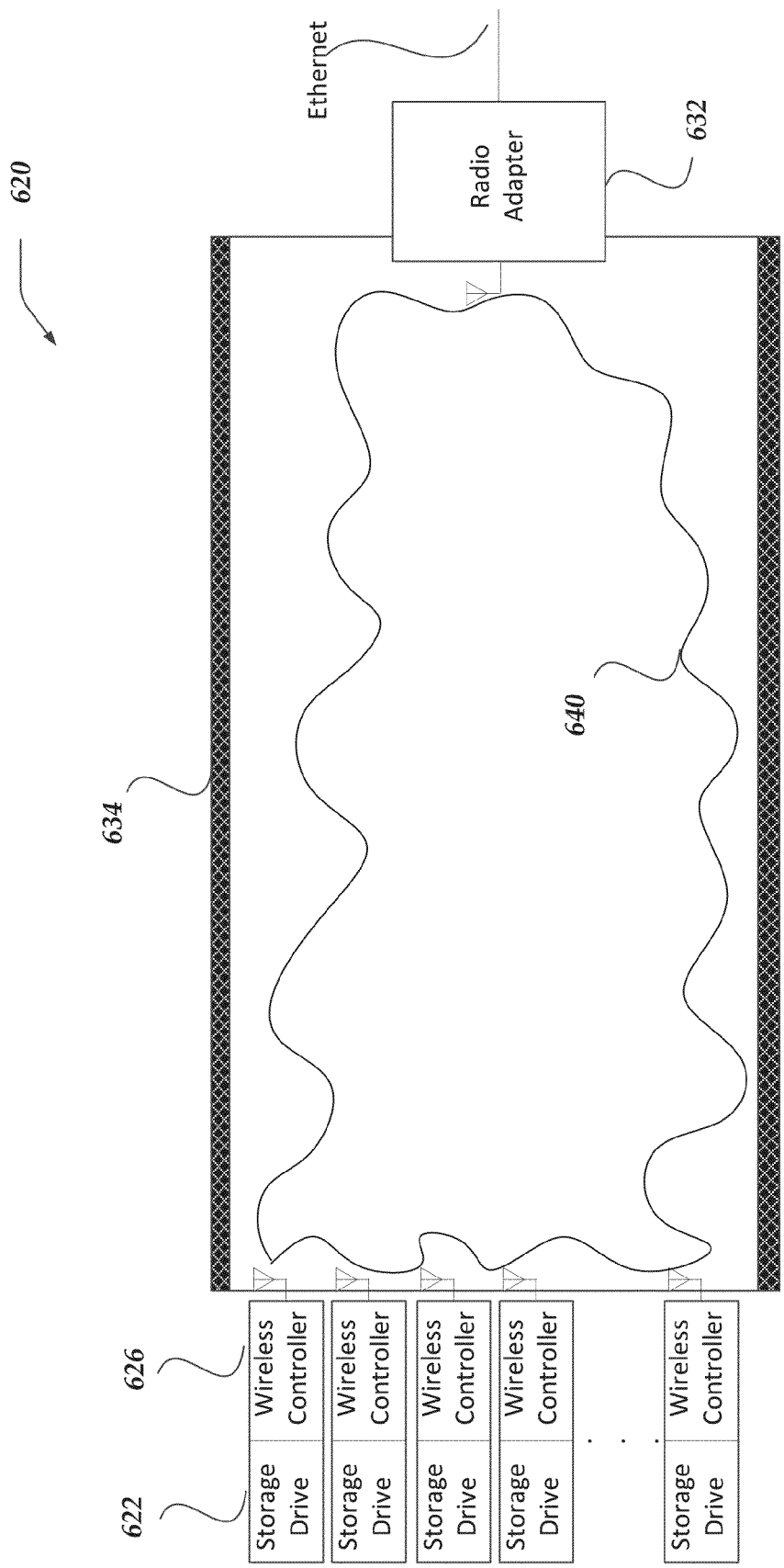
FIG. 6 shows a schematic view of a wireless communication system that includes a plurality of storage drives, corresponding wireless controllers, and a radio adapter electromagnetically coupled via a waveguide.

FIG. 6 shows a schematic view of a wireless communication system that includes a plurality of storage drives, corresponding wireless controllers, and a radio adapter electromagnetically coupled via a waveguide. Chassis portion 620 includes a plurality of non-specific storage drives 622 and a corresponding plurality of wireless controllers 626. Each of the plurality of wireless controllers 626 is communicatively coupled to and controls the corresponding storage drive 622. Furthermore, each of the wireless controllers 626 includes at least a first wireless interface that is electromagnetically coupled to waveguide 634. In various embodiments, each of the wireless interfaces includes one or more antennas that is configured and arranged to transmit and receive wireless signals via waveguide 634.

Chassis portion 620 additionally includes one or more radio adaptors, such as radio adapter 632. Radio adaptor 632 is electromagnetically coupled to waveguide 634 via a wireless interface. For instance, radio adapter 632 includes one or more antennas that are positioned to transmit and receive wireless signals via waveguide 634. In a preferred embodiment, radio adapter 632 includes at least a first connector that is enabled to transmit and receive signals to and from another network device over a network, such as through an Ethernet protocol. The plurality of signals 640 schematically represents the transmission, via waveguide 634, of wireless signals between various pairs of the wireless controllers 626 and between the wireless controllers 626 and the radio adapter 632.

Figure 7:
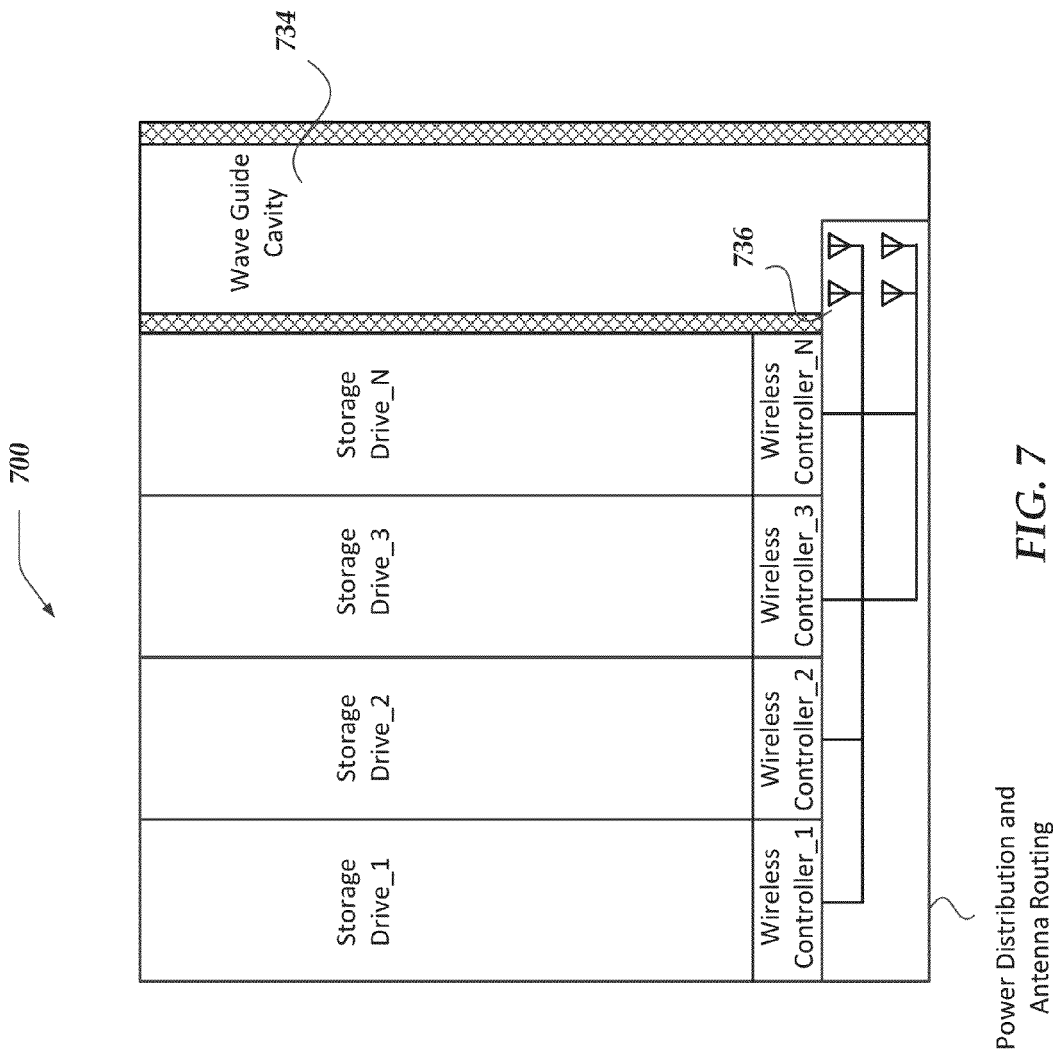
FIG. 7 shows a front schematic view of one embodiment of a tiled configuration of a plurality of non-specific storage drives and corresponding wireless controllers electromagnetically coupled to a vertical waveguide.

FIG. 7 shows a front schematic view of one embodiment of a tiled configuration of a plurality of non-specific storage drives and corresponding wireless controllers electromagnetically coupled to a vertical waveguide. The tiled configuration, or simply tile 700, includes a plurality of storage drives and a corresponding plurality of wireless controllers. Specifically, tile 700 includes N storage drives and N wireless controllers, where N is a positive integer. In the preferred embodiment shown in FIG. 7, N=4, however it should be understood that in other embodiments N may be greater or less than four.

In various embodiments, the plurality of storage drives and wireless controllers are provided power through a connection to the backplane of a chassis, as discussed throughout. Furthermore, the wireless interfaces include an antenna routing that provides at least one antenna for each of the wireless controllers' access to waveguide 734. At least one of the power distribution or antenna routing may be at least partially enabled by flex circuit components. For instance, the transmitting/receiving antennas may be printed on a flexible circuit that is operative to extend into the cavity of waveguide 734. Waveguide 734 includes a port or inlet 736 to provide the antennas of the wireless controllers access to the transmitting cavity or airspace of waveguide 734. Note that each of the plurality of wireless controllers of tile 700 is provided access to waveguide 734 via the common port 736. In various embodiments, waveguide 734 is configured and arranged to transmit wireless signals, such as RF signals, along a substantially vertical direction.

Figure 8A:
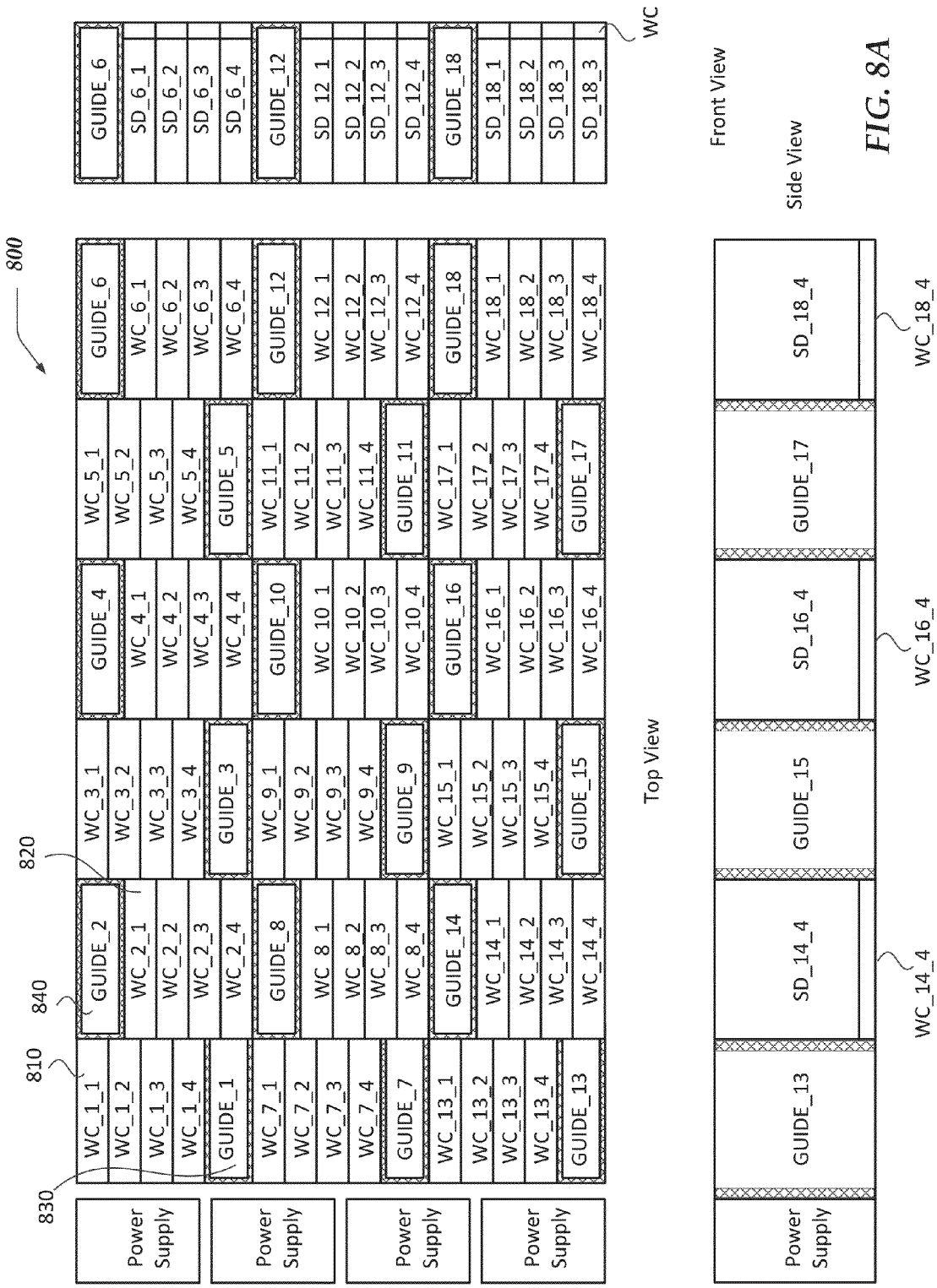
FIG. 8A shows top, front, and side views of an exemplary, but non-limiting embodiment of a wireless data storage chassis shelf populated with a plurality of storage drives ("SD") and corresponding wireless controllers ("WC")

FIG. 8A shows top, front, and side schematic views of an exemplary, but non-limiting embodiment of a wireless data storage chassis shelf populated with a plurality of storage drives ("SD") and corresponding wireless controllers ("WC"). Shelf 800 may be similar to uppermost shelf 542 or lowermost shelf 540 of chassis 530 of FIG. 5. From the top view of shelf 800, a plurality of wireless controllers are visible. The front and side views show the vertical stacking of the corresponding pairs of storage drives and wireless controllers. As shown in FIG. 8A, the storage drives and wireless controllers are arranged in a tiled configuration, including at least a first tile 810 and second tile 820. Each tile includes a plurality of storage drives and corresponding wireless controllers. Each one of the tiled configurations, including first and second tiles 810/820 may be similar to tile 700 of FIG. 7. As such, each tile shown in FIG. 8 includes N=4 storage drive and wireless controller pairs, although other embodiments are not so limited. For instance, in other embodiments, N for each tile may be greater or less than four.

Furthermore, a plurality of waveguides, including a first waveguide 830 (GUIDE_1) and a second waveguide 840 (GUIDE_2) pass through shelf 800. The plurality of waveguides are configured and arranged to transmit wireless communication signals in a direction that is substantially orthogonal to a plane defined by shelf 800 (and by page of FIG. 8A). Each of the wireless controllers of each tile is electromagnetically coupled to one of the waveguides. Thus, in a similar manner to tile 700 and waveguide 734 of FIG. 7, each of wireless controllers in each of the tiles is operative to transmit and receive wireless communication signals along one of the waveguides that pass through shelf 800.

Each tile is electromagnetically coupled to one of the waveguides. For instance, each tile may include a flexible circuit element that is positioned or otherwise received by a port in a waveguide. The port provides the wireless controllers of the tile access to the internal cavity of a waveguide. In a preferred embodiment, the number of tiles in shelf 800 is equivalent to the number of waveguides that pass through shelf 800, such that there is a one-to-one mapping or correspondence for the electromagnetically coupling of the tiles to the waveguides.

The tiles are arranged in a two dimensional array within shelf 800. The two-dimensional array may be an m×n array of tiles, where each of m and n are positive integers. In the embodiment shown in FIG. 8A, each alternating column of the m×n array is offset or staggered. Other embodiments are not so constrained, and the tiles may be organized in any suitable structure. In preferred embodiments, there are m×n waveguides passing through a shelf, one for each of a corresponding tiles. As described in greater detail below, multiple waveguides within a chassis enable the multiplexing of the geometry of the chassis, resulting in an enhanced bandwidth. In the embodiment shown in FIG. 8A, m=6 and n=3. There are 6×3=18 tiles positioned in shelf 800. There are also 18 separate and distinct waveguides passing through shelf 800. Furthermore, shelf 800 includes N×(m×n)=72 pairs of storage drives and wireless controllers. For a chassis that includes X shelves, the chassis may house X×(m×n) tiles or X×(N×(m×n)) storage drives/wireless controller pairs, where X is a positive integer. Other embodiments are not so constrained, and each of X, N, m and n may be virtually any positive integer.

The number of waveguides passing through a shelf scales with the number tiles positionable within the shelf. For instance, in a preferred embodiment, a chassis includes Y×(m×n) waveguides or separate and distinct wave guide portions, where Y is a positive integer based on a geometrical multiplexing factor. For instance, when a termination plate subdivides a single waveguide into separate and distinct portions, such as termination plate 550 of FIG. 5 or termination plate 1048 of FIG. 10C, Y=2, because the termination plate has resulted in twice as many separate and distinct (i.e. electromagnetically isolated) multiplexed waveguide portions.

The four wireless controllers included in first tile 810 are notated as: WC_1_1, WC_1_2, WC_1_3, and WC_1_4. In the notation WC_i_j, the first index (i) indicates the tile index and the second index (j) indicates the wireless controller index for the tile. Likewise, the four storage drives of first tile 810 are notated as: SD_1_1, SD_1_2, SD_1_3, and SD_1_4. The wireless interfaces for each of the wireless controllers included in first tile 810 are configured and arranged to transmit and receive wireless communication signals along the first waveguide 830, which is notated as GUIDE_1, where the integer index indicates the corresponding tile index. Thus, the first waveguide 830 is common to each of the wireless controllers of first tile 810.

Likewise, second tile 820 includes four wireless controllers: WC_2_1, WC_2_2, WC_2_3, and WC_2_4 and four storage devices: SD_2_1, SD_2_2, SD_2_3, and SD_2_4. The wireless interfaces for each of the wireless controllers included in second tile 820 are configured and arranged to transmit and receive wireless communication signals along the second waveguide 840 (GUIDE_2). Thus, the second waveguide 840 is common to each of the wireless controllers of second tile 820. As shown in FIG. 8A, each of tiles and corresponding common waveguides are notated using similar nomenclature. As discussed herein, each of the wireless controllers in a tile is electromagnetically coupled to a particular waveguide and are operative to wirelessly communicate with other wireless controllers of corresponding tiles populating other shelves in a chassis, where the corresponding tiles are also electromagnetically coupled to the particular waveguide. In various embodiments, at least the wireless controllers and the storage drives are provided power via a backplane of shelf 800, as shown in FIG. 8A.

Figure 8B:
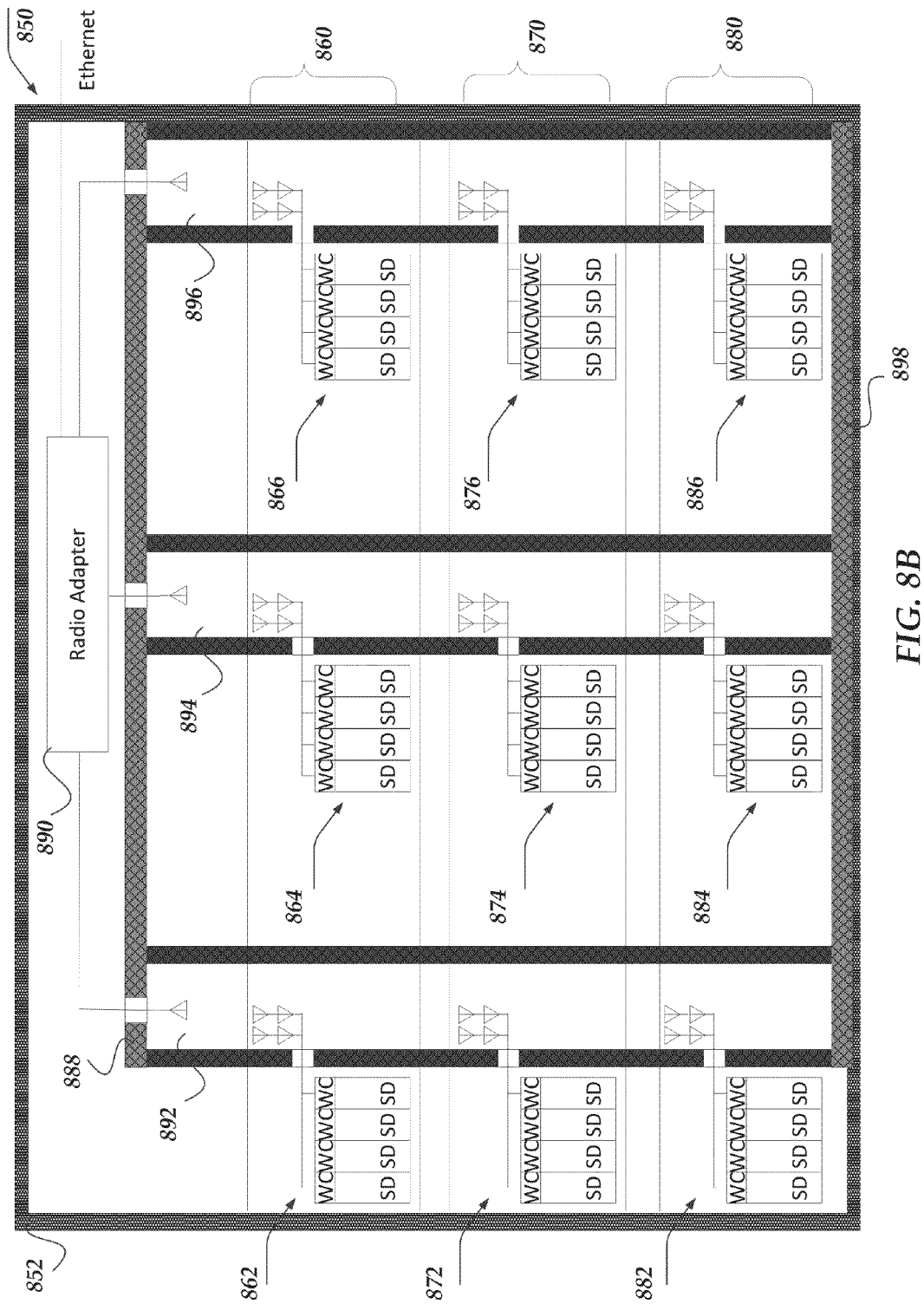
FIG. 8B shows a schematic view of a wireless chassis where a plurality of waveguides communicatively couple corresponding storage drive controllers across a plurality of vertically stacked chassis shelves.

FIG. 8B shows a schematic view of a wireless chassis where a plurality of waveguides communicatively couple corresponding storage drive controllers across a plurality of vertically stacked chassis shelves. Wireless chassis 850 includes a housing 852 to house devices, such as storage drives, wireless controllers, radio adapters, power supplies, waveguides, and the like. Wireless chassis 850 further includes a first shelf 860, a second shelf 870, and a third shelf 880. Each of shelves 860/870/890 may be similar and include more or less features than shelf 800 of FIG. 8A. In other embodiments, wireless chassis 850 includes more or less shelves.

Furthermore, wireless chassis 850 includes a first waveguide 892, a second waveguide 894, and a third waveguide 896. Each of waveguides 892, 894, and 896 is terminated from above and below by an upper termination plate 888 and a lower termination plate 898 respectively. Other embodiments include fewer or more than three waveguides, as well as fewer than or more than two termination plates. For instance, as shown in FIG. 8A, 18 separate and distinct waveguides pass through shelf 800. Also, another termination plate may be positioned vertically intermediate the upper and lower termination plates 888/898 to subdivide at least one of the waveguides 892/894/896 into electromagnetically isolated waveguide portions. Each waveguide 892/894/896 passes through each of shelves 860/870/880.

A radio adapter 890 is electromagnetically coupled to each of first waveguide 892, second waveguide 894, and third waveguide 896. Such coupling is schematically represented by an antenna included a wireless interface of radio adapter positioned to receive and transmit wireless communication signals within each of waveguides 892/894/896. Radio adapter 890 includes a first connector, or at least a remote communication interface, that is operative to communicate to network devices over a network. The first connector is schematically represented as an Ethernet connection. In at least one embodiment, radio adapter 890 is operative to wirelessly communicate with network devices, exterior to the chassis 890.

First shelf 860 includes three tiled configurations of storage devices (SD) and corresponding wireless controllers (WC): tiles 862, 864, and 866. As discussed throughout, in other embodiments, a shelf may include more or less than three tiles. For instance, shelf 800 of FIG. 8A is populated with 18 tiles. Likewise, second shelf 879 is populated with three tiles 872/874/876 and third shelf 880 is populated with three other tiles 882/884/886. Each of the tiles included in the shelves may be similar to and include more or less features than tile 700 of FIG. 7.

Each of tiles 862, 872, and 882 are electromagnetically coupled to first waveguide 892, via ports in waveguide 892. Such coupling is schematically represented by an antenna (included in the corresponding wireless interface) for each of the wireless controllers in each of tiles 862/872/882 positioned to receive and transmit wireless communication signals within first waveguide 892. Each of the wireless controllers in each of tiles 862, 872, and 882 is operative to wirelessly communicate with each of the other wireless controllers of tiles 862, 872, and 882, as well as radio adapter 890, via first waveguide 892.

Similarly, each of tiles 864, 874, and 884 are electromagnetically coupled to second waveguide 894. Thus, any wireless controller of tiles 864, 874, and 884 can wirelessly communicate to any other wireless controller of tiles 864, 874, and 884, as well as radio adapter 890 via second waveguide 894. Each of tiles 866, 876, and 886 are electromagnetically coupled to third waveguide 896 and are operative to wirelessly communicate with any other device electromagnetically coupled to third waveguide 896. If should be noted that tiles electromagnetically coupled to separate and distinct waveguides or waveguide portions are operative to wirelessly communicate via radio adapter 890 because radio adapter 890 is common to each of the waveguides 892, 894, and 896.

FIG. 9A shows a schematic view of an embodiment of a mating or coupling surface of radio adapter that is operative to electromagnetically couple to a plurality of waveguides included in a wireless chassis. The mating surface of radio adapter, as shown in FIG. 9A is configured and arranged to mate to a plurality of waveguides within a wireless chassis. Specifically, radio adapter 990 communicatively couples to the waveguides passing through shelf 800 of FIG. 8A by the mating surface mating with terminal ends of the waveguides.

Radio adapter 990 includes a plurality of channel elements, including at least a first channel element 932 and a second channel 942, where are schematically represented in FIG. 9A to each include four antennas. The plurality of channel elements are arranged in a staggered m×n array, similar to the staggered array of tiles and waveguides of shelf 800 of FIG. 8A. Note the geometry of the staggered array corresponds to the staggering of the waveguides in shelf 800. Accordingly, the mating surface of radio adapter 990 corresponds to the tiled configuration and waveguide configuration of a plurality of shelves included in a wireless chassis.

Each of the plurality of channel elements is operative to electromagnetically couple to a terminal end of a single waveguide included in the wireless chassis. Each of the channel elements may include a portion of the one or more wireless interfaces of radio adapter 990. Via the plurality of channel elements, radio adapter 990 is operative to wirelessly communicate along a plurality of waveguides, in a similar manner that radio adapter 890 of FIG. 8B is common to, and operative to wirelessly communicate to other devices electromagnetically coupled to any of waveguides 892, 894, and 896.

As such, each of the channel elements is operative employ one or more antennas to transmit and receive wireless signals along the waveguide that is electromagnetically coupled to the particular channel element. As shown in the embodiment of FIG. 9A, each of the channel elements employ one or more separate and distinct antennas. However, it should be understood that other embodiments are not so limited and each of the channel elements may employ more than or less than four antennas to wirelessly communicate along each of a plurality of waveguides.

As noted above, radio adapter 990 is configured and arranged for a wireless chassis that includes one or more shelves similar to shelf 800 of FIG. 8A. Because there are 18 waveguides passing through shelf 800, radio adapter 990 includes 18 channel elements; one channel element for each of the waveguides passing through shelf 800. First channel element 932 is operative to electromagnetically couple to first waveguide 830 of FIG. 8A and second channel element 942 is operative to electromagnetically couple to second waveguide 840 of FIG. 8A. Each of the other channel elements of radio adapter 990 is operative to couple to one of the other waveguides passing through shelf 800 of FIG. 8A. It should be understood that radio adapter 990 is a non-limiting embodiment, and other configurations are possible so that less than or more than 18 wireless interfaces are included in a single radio adapter.

FIG. 9B shows a schematic view of the plurality of channel elements included in a radio adapter. In various embodiments of radio adapter 990 of FIG. 9B, radio adapter 990 includes a plurality of channel elements, including first channel element 932 and second channel element 942 that provide interfaces to a plurality of waveguides that geometrically multiplex a wireless chassis. In at least one embodiment, a wireless protocol to Ethernet protocol translation is performed by each of the channel elements. In other embodiments, the wireless protocol to Ethernet protocol translation for each of the channel elements is performed by another component of radio adapter 990.

FIG. 10A shows a front view of an embodiment of a wireless data storage chassis that is consistent with the various embodiments disclosed herein. Chassis 1000 includes a plurality of vertically stacked shelves 1010. In the embodiment shown in FIG. 10A, chassis 1000 includes ten shelves 1010, but it should be understood that other embodiments include more or less than 10 shelves. Each of the plurality of shelves may receive a plurality of storage drives and corresponding wireless controller. In at least one embodiment, each shelve may receive a plurality of tiles, such as tile 700 of FIG. 7. In some embodiments, each shelf may be similar, or at least include similar features to shelf 800 of FIG. 8A.

Chassis 1000 includes a plurality of waveguides 1002. The waveguides may be arranged in a two dimensional staggered or non-staggered m×n array. In the embodiment shown in FIG. 10A, m=6 and n=3, although each of m and n may be any positive integer. Accordingly, chassis 1000 includes 18 waveguides. Because FIG. 10A shows a front view of chassis 1000, only three of the 18 waveguides are visible. As shown, each of the plurality of waveguides 1002 is substantially a vertical waveguide and passes through each of the plurality of vertically stacked shelves 1010. In a preferred embodiment, each of the plurality of shelves is populated a two dimensional array of tiles, wherein each tile is electromagnetically coupled to one of the plurality of waveguides, as shown in chassis 850 in FIG. 8B. Each of the waveguides is terminated by a termination plate 1006. In various embodiments, the plurality of storage drives at least partially surround each of the plurality of waveguides 1002. The storage-drive carries, such as storage drive carrier 524 of FIG. 5, may at least provide some RF-shielding or a Faraday cage-like effect to shield the signals within the plurality of waveguides 1002. The housing of chassis 1000 may provide additional shielding. Accordingly, the wireless signals transmitted along the waveguides 1002 may not be detectable or otherwise intercepted from outside chassis.

Chassis 1000 includes a radio adapter 1004. The plurality of waveguides 1002 and the radio adapter 1004 enable a wireless communication between each of the wireless controllers that are received by the plurality of shelves 1010. In various embodiments, a mating surface of radio adapter 1994, such as the mating surface of radio adapter 990 of FIG. 9A is configured and arrange to mate with the ends of the waveguides 1002.

FIG. 10B shows a front view of an embodiment of a redundant wireless data storage chassis that is consistent with the various embodiments disclosed herein. Chassis 1020 may include similar features to those included in chassis 1000 of FIG. 10A. Furthermore, chassis 1020 may include more or less features than those included in chassis 1000. For instance, chassis 1020 includes a plurality of waveguides 1022 that pass through a plurality of shelves 1030. Chassis 1020 includes two radio adapters: an upper radio adapter 1024 and a lower radio adapter 1026. The upper/lower or first/second radio adapters 1024/1026 may be redundant radio adapters, such that if the operation of one of the radio adapters 1024/1026 were to be interrupted or if a radio adapter 1024/1026 were to malfunction or become damaged, the operation of wireless chassis 1020 would not be interrupted. Accordingly, chassis 1020 is a redundant wireless chassis.

Figures 10C, 10D:
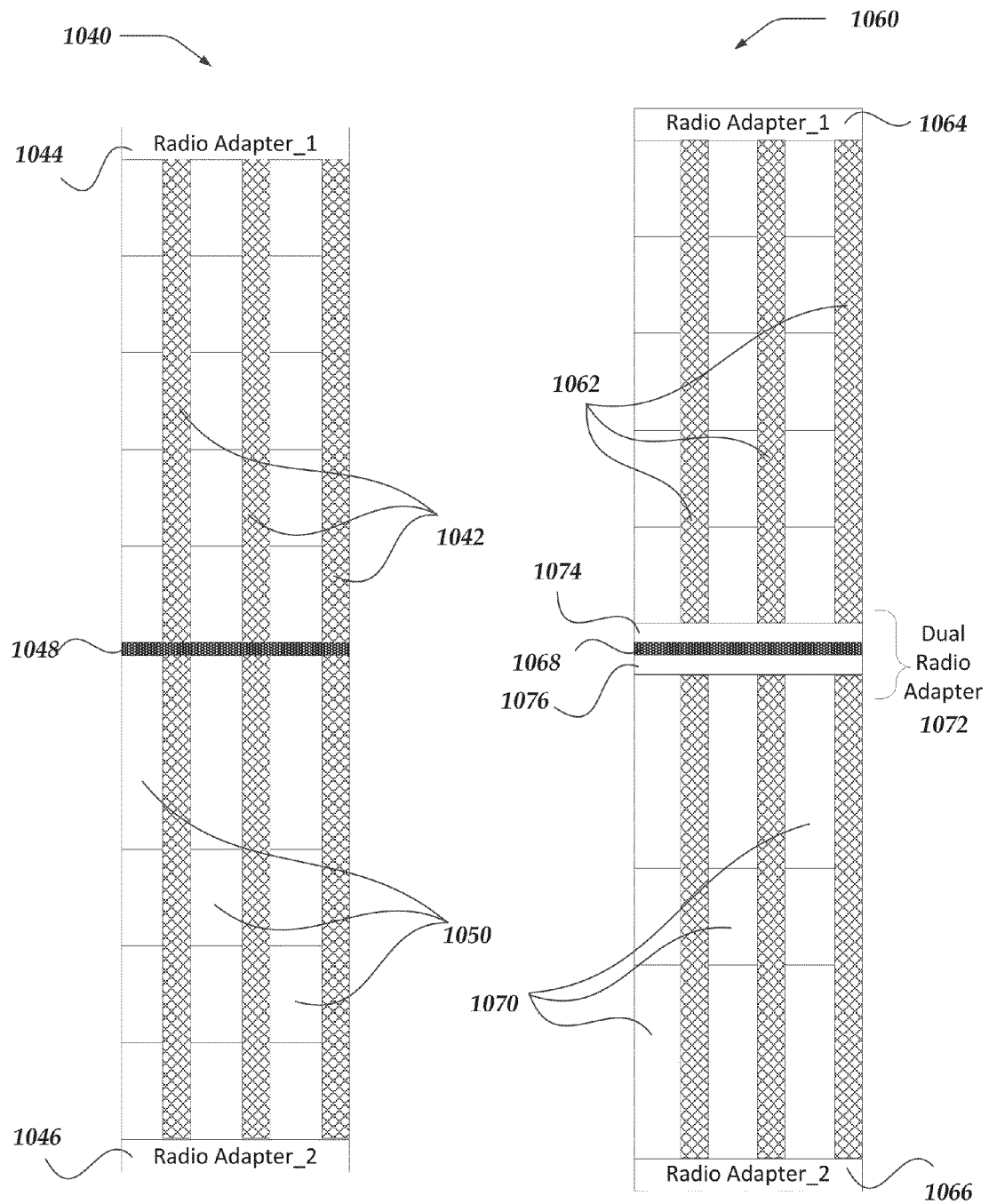
FIG. 10C shows a front view of an embodiment of a geometrically multiplexed wireless data storage chassis that is consistent with the various embodiments disclosed herein.
FIG. 10D shows a front view of an embodiment of a geometrically multiplexed and redundant wireless data storage chassis that is consistent with the various embodiments disclosed herein.

FIG. 10C shows a front view of an embodiment of a geometrically multiplexed wireless data storage chassis that is consistent with the various embodiments disclosed herein. Chassis 1040 may include similar features to those included in chassis 1020 of FIG. 10B or chassis 1000 of FIG. 10A. Furthermore, chassis 1040 may include more or less features than those included in either of chassis 1020 or chassis 1000. For instance, chassis 1040 includes a plurality of waveguides 1042 that pass through a plurality of shelves 1050. Chassis 1040 includes two radio adapters: an upper radio adapter 1044 and a lower radio adapter 1046.

A termination plate 1048 subdivides each of the plurality of waveguides 1042 into two portions: an upper portion and a lower portion. Termination plate 1048 electromagnetically isolates the upper portions of each waveguide from the lower portion of the waveguide. In a similar manner as the first radio adapter 532 of FIG. 5 is communicatively coupled to the upper portion of waveguide 534 of FIG. 5, the upper radio adapter 1044 is electromagnetically coupled to the upper portions of each of the plurality of waveguides 1042. Likewise, the lower radio adapter 1046 is electromagnetically coupled to the lower portions of each of the plurality of waveguides 1042. Accordingly, each of the tiles in shelves that are above termination plate 1048 are operative to wirelessly communicate with the other tiles in the upper shelves and upper radio adapter 1044. Likewise, each of the tiles in shelves that are below termination plate 1048 are operative to wirelessly communicate with the other tiles in the lower shelves and lower radio adapter 1046. Thus, the geometry of the plurality waveguides 1042 is multiplexed. Accordingly, chassis 1040 is a geometrically multiplexed wireless data storage chassis.

FIG. 10D shows a front view of an embodiment of a geometrically multiplexed and redundant wireless data storage chassis that is consistent with the various embodiments disclosed herein. Chassis 1060 may include similar features to those included in chassis 1040 of FIG. 10C, chassis 1020 of FIG. 10B, or chassis 1000 of FIG. 10A. Furthermore, chassis 1060 may include more or less features than those included in at least one of chassis 1040, chassis 1020, or chassis 1000. For instance, chassis 1060 includes a plurality of waveguides 1062 that pass through a plurality of shelves 1070. Chassis 1060 includes two radio adapters: an upper radio adapter 1064 and a lower radio adapter 1066.

A termination plate 1068 subdivides each of the plurality of waveguides 1062 into two portions: an upper portion and a lower portion. The upper radio adapter 1064 is electromagnetically coupled to the upper portions of each of the plurality of waveguides 1062. Likewise, the lower radio adapter 1066 is electromagnetically coupled to the lower portions of each of the plurality of waveguides 1062. Chassis 1060 is a geometrically multiplexed wireless data storage chassis.

Chassis 1060 also includes a dual radio adapter 1072 that is electromagnetically coupled to the upper and lower portions of the subdivided plurality of waveguides 1062. Thus, dual radio adapter spans termination plate 1068. Dual radio adapter 1072 includes a first radio adapter 1074 that is operative to transmit and receive wireless communication signals in the upper portion of the plurality of waveguides 1062. Dual radio adapter 1072 also includes a second radio adapter 1074 that is operative to transmit and receive wireless communication signals in the lower portion of the plurality of waveguides 1062. In a preferred embodiment, the first radio adapter 1074 of dual radio adapter 1072 is communicatively coupled to the second radio adapter 1076 of dual radio adapter 1072. Chassis 1060 is a redundant chassis because if the operation of one of the radio adapters is interrupted, the operation of chassis 1060 will not be interrupted.

Multiplexing a Bandwidth of a Wireless Data Storage Chassis

Figure 11:
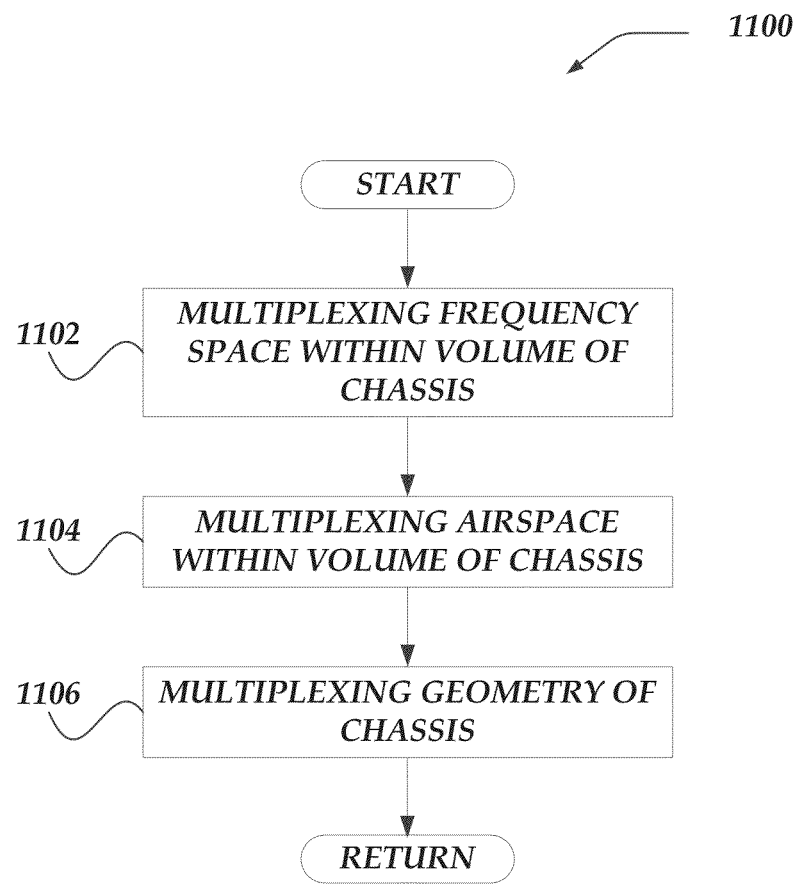
FIG. 11 illustrates a logical flow diagram generally showing an embodiment of a process for multiplexing or increasing a bandwidth of a wireless data storage chassis.

FIG. 11 illustrates a logical flow diagram generally showing an embodiment of a process for multiplexing, increasing, or otherwise enhancing a bandwidth of a wireless data storage chassis. Process 1100 may begin, after a start block, at block 1102, where a frequency space within the volume of a chassis is multiplexed. Multiplexing frequency spaces are discussed in greater detail in regards to FIGS. 12A-12B. Process 1100 may proceed to block 1104, where an airspace within the volume of a chassis is multiplexed. Multiplexing an airspace is discussed in greater detail in regards to FIGS. 13-15B. Process 1100 may proceed next to block 1006, where the geometry of the chassis is multiplexed.

Figure 12A:
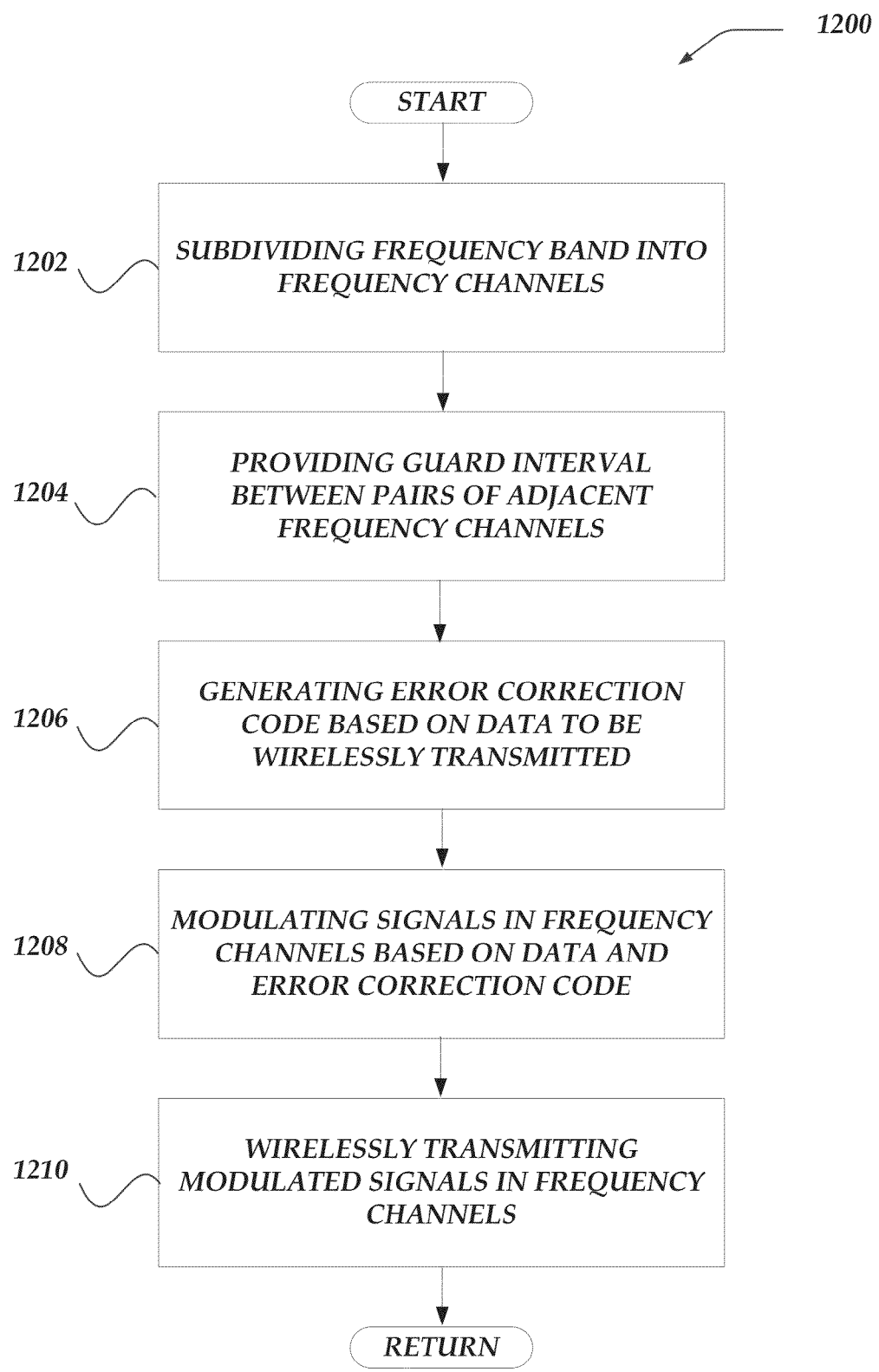
FIG. 12A illustrates a logical flow diagram generally showing an embodiment of a process for multiplexing a frequency space within a volume of a chassis when wirelessly transmitting data.

Many wireless protocols, such as, but not limited to WiFi (IEEE 802.11), Bluetooth (IEEE 802.15.1), WiMax (IEEE 802.16), WiMax MIMO, WiMax MISO, ZigBee (IEEE 802.15.4), MiWi (IEEE 802.15.4), and the like provide standards for various embodiments of multiplexing a frequency space. However, briefly FIG. 12A illustrates a logical flow diagram generally showing an embodiment of a process for multiplexing a frequency space within a volume of a chassis when wirelessly transmitting data. Process 1200 may begin, after a start block, at block 1202, where at least a portion of a frequency band is subdivided into a plurality of frequency channels.

For an exemplary, but non-limiting embodiment, the IEEE 802.11ac is a wireless communication standard for communication in the 5 GHz band and provides standards for multiplexing the frequency band into a plurality of frequency channels. Depending on the specific Modulation and Coding Scheme (MCS) index chosen, the 5 GHz bands is subdivided into a plurality frequency channels. For instance, the 5 GHz band may be subdivided into frequency channels that are at least one of 20 MHz, 40 MHz, 80 MHz, or 160 MHz wide. The total number of frequency channels depends on the width of each channel.

Process 1200 may proceed to next to block 1204, where a guard interval is provided between each pair of adjacent frequency channels. For instance, depending on the MCS index chosen, guard intervals of a width of 400 ns or 800 ns are provided between adjacent frequency channels.

Process 1200 proceeds to block 1206, where an error correction code is generated. The generated error correction code is based on the data to be transmitted. At block 1208, a plurality of signals in one or more of the frequency channels is modulated. Modulating the signals is based on at least the data to be transmitted and the error correction code. Various modulating schemes may be employed to modulate the plurality of signals. For instance, the 802.11ac protocol employs at least one of BPSK, QPSK, or 16-/64-/256-QAM modulation, depending on the MCS index chosen.

Process 1200 proceeds to block 1210, where the modulated plurality of signals are wirelessly transmitted in one or more of the frequency channels. For instance, the plurality of signals may be transmitted along a waveguide as discussed herein. In various embodiments, at least one of a wireless controller or a radio adapter transmits the signals along a wireless waveguide. After block 1210, process 1200 may return to a calling process to perform other actions. Although the IEEE 802.11ac standard is discussed herein, it is understood that any other process to multiplex a frequency space may be employed, such as, but not limited to IEEE 802.11ad.

Figure 12B:
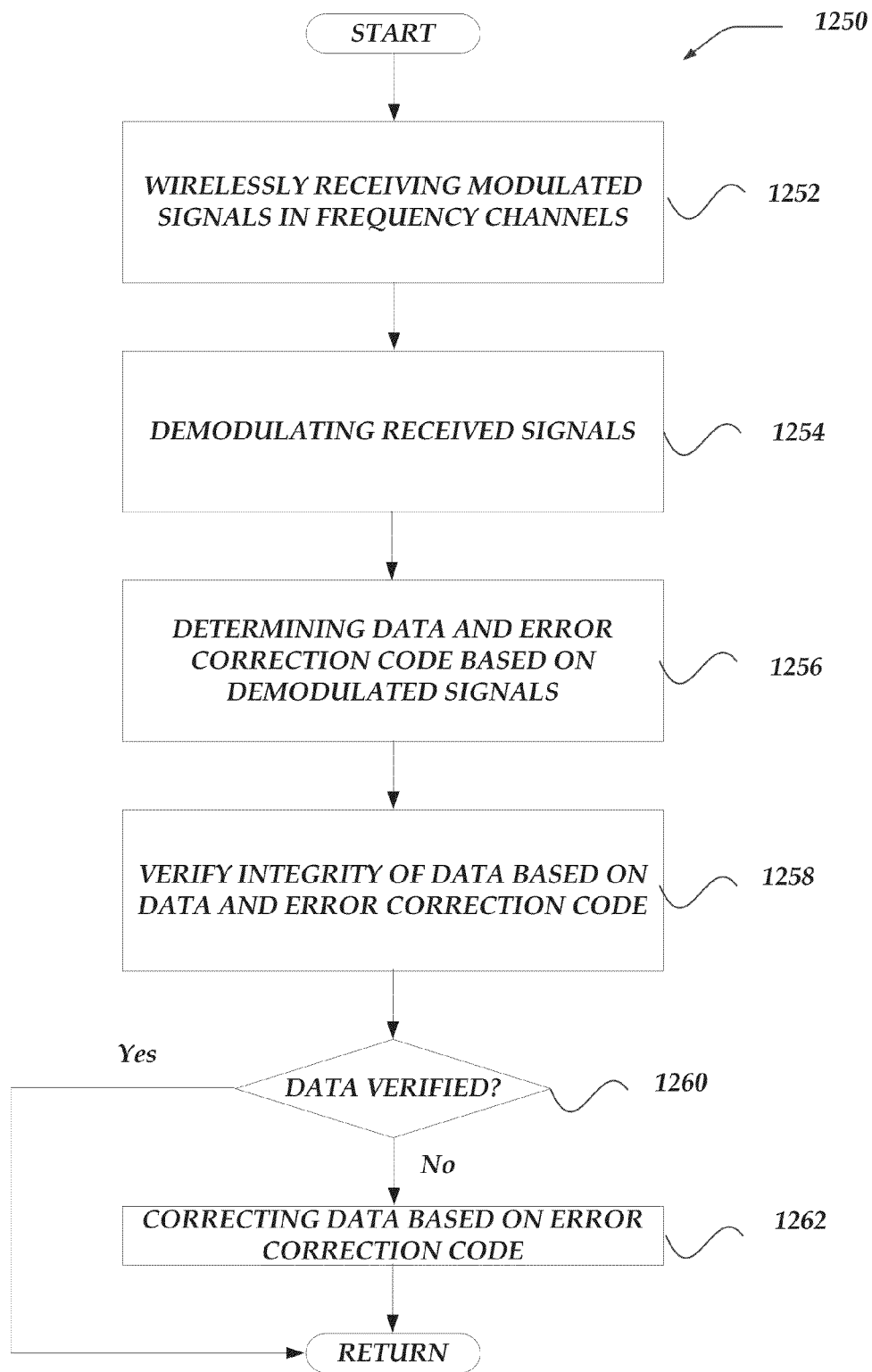
FIG. 12B illustrates a logical flow diagram generally showing an embodiment of a process for multiplexing a frequency within a volume of a chassis when wirelessly receiving data.

FIG. 12B illustrates a logical flow diagram generally showing an embodiment of a process for multiplexing a frequency within a volume of a chassis when wirelessly receiving data. Process 1250 may begin, after a start block, at block 1252, where a plurality of modulated signals in one or more frequency channels is wirelessly received. For instance, the signals may be received within a waveguide in a wireless chassis. At least one of a radio adapter or a wireless controller may receive the signals within the waveguide. In at least one embodiment, the received signals are the signals that were transmitted at block 1210 of process 1200 of FIG. 12A.

At block 1254, the received signals are demodulated based on the MCS index. At block 1256, the data is determined based on the demodulated signals. An error correction code may also be determined based on the demodulated signals. At block 1258, an integrity of the data is verified based on the determined data and the error correction code. At decision block 1260, it is determined if the data is verified. If the data is not verified, process 1250 proceeds to block 1262, where the data is corrected based on the error correction code. Process 1250 may return to a calling process to perform other actions.

Figure 13:
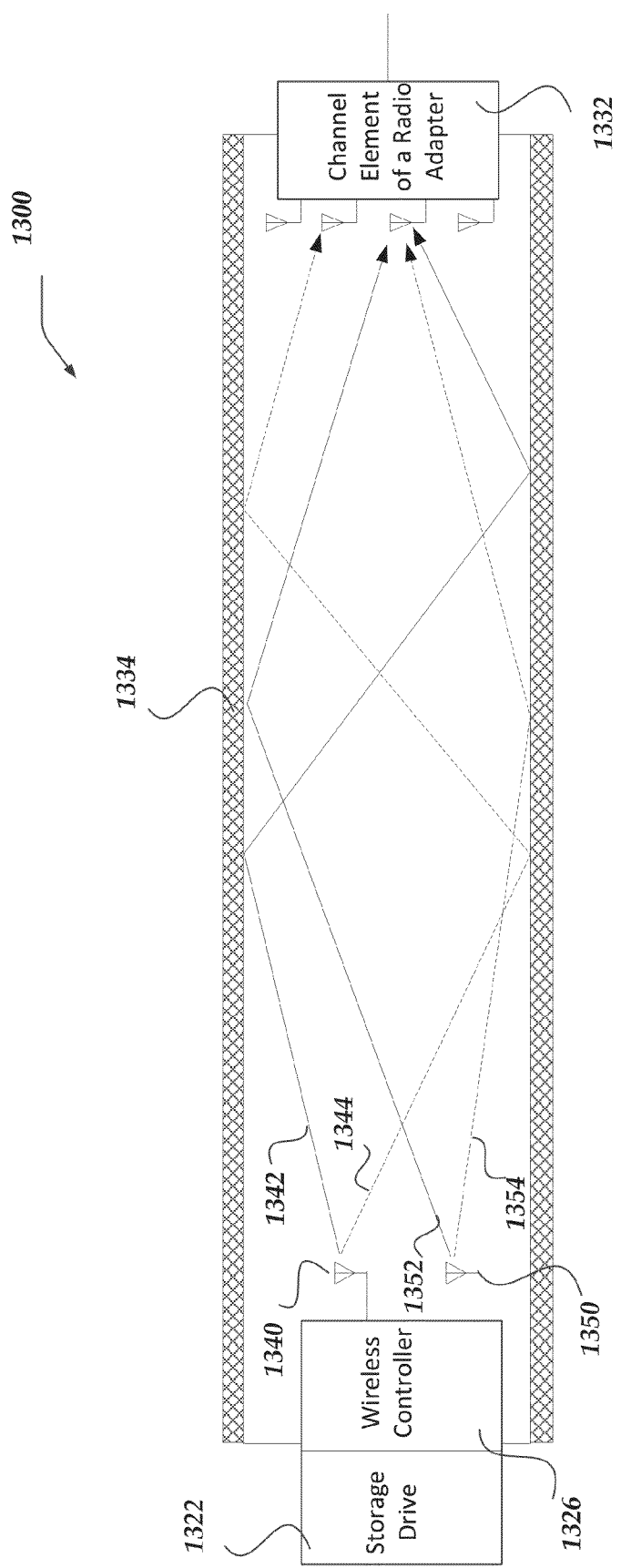
FIG. 13 illustrates employing multiple wireless signal paths to multiplex an airspace within the volume of a chassis.

FIG. 13 illustrates employing multiple wireless signal paths to multiplex an airspace within the volume of a chassis. In various embodiments, a multiple-input and multiple-output (MIMO) process is employed to multiplex an airspace with the volume of a chassis. Various wireless protocols incorporate or otherwise support one or more MIMO or MIMO-like multiple signal path approaches to multiplexing an airspace. Wireless chassis portion 1300 includes one or more storage drives 1322, a corresponding wireless controller 1326, and a radio adapter 1332. The wireless controller 1326 and the radio adapter 1332 are operative to wirelessly communicate along waveguide 1334. As discussed herein, in various embodiments, wireless controller 1326 includes a plurality of antennas. As shown in FIG. 13, wireless controller 1326 includes two antennas electromagnetically coupled to waveguide 1334: first antenna 1340 and second antenna 1350. However, in other embodiments, a wireless controller may include additional antennas. As shown in FIG. 13, the first antenna 1340 and the second antenna 1350 are transmitting antennas, however the first and second antennas 1340/1350 are operative as receiving antennas also.

A channel element of radio adapter 1332, such as channel element 932 or 942 of FIGS. 9A-9B, includes a plurality of antennas that are electromagnetically coupled to waveguide 1334. In the embodiment shown in FIG. 13, the channel element includes four antennas, but other embodiments may include more or less than four antennas. As shown in FIG. 13, the plurality of antennas of the channel element are receiving antennas, however these antennas are operative as receiving antennas also.

The first antenna 1340 of wireless controller is shown transmitting a first signal. The first signal if first antenna 1340 propagates along waveguide 1334 in multiple paths, including at least first signal path 1342 and a second signal path 1344. As shown, the first signal of the first antenna 1340 is received by the plurality of antennas of radio adapter 1332. Likewise, the second antenna 1350 transmits a second signal that propagates along waveguide 1334 in multiple paths, including at least a third signal path 1352 and fourth signal path 1354. The plurality of antennas of radio adapter 1332 also receive the second signal transmitted by second antenna 1350.

Figure 15A:
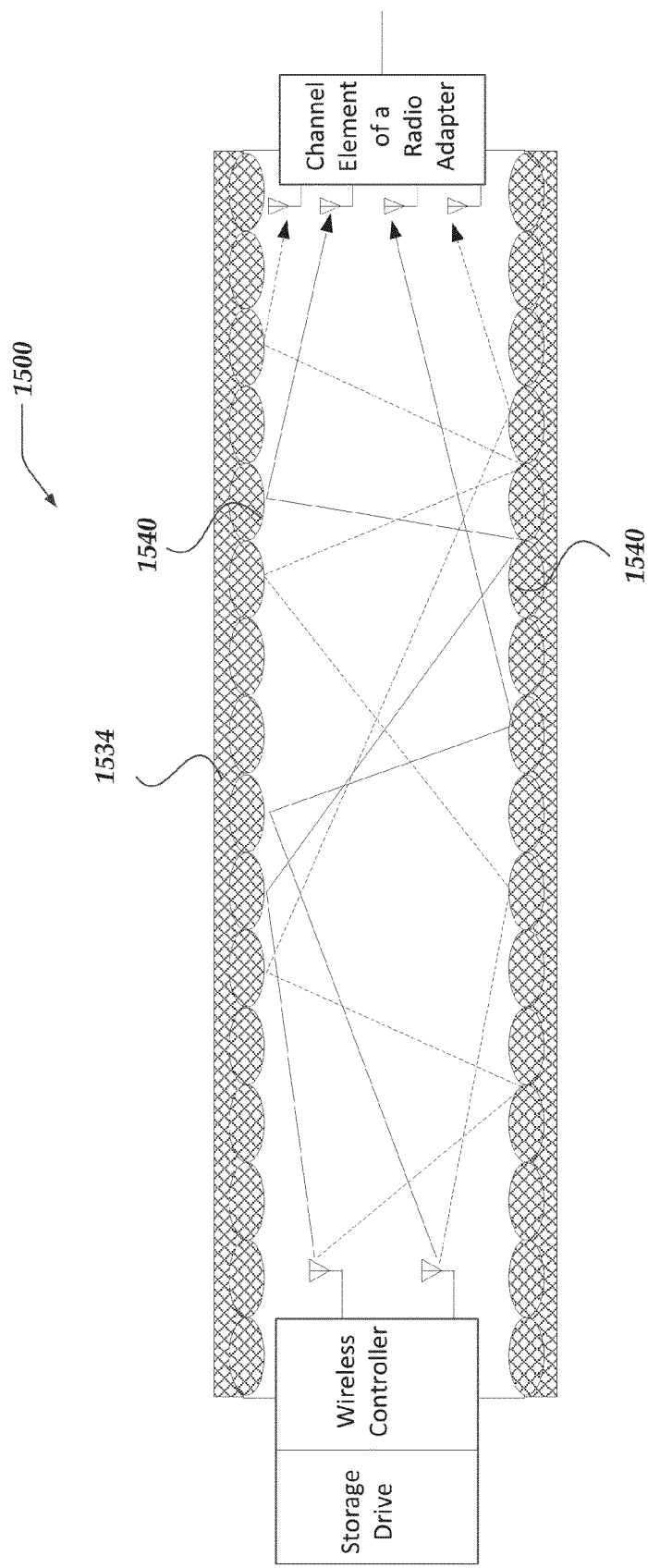
FIG. 15A illustrates corrugations along the internal surfaces of a waveguide which are configured and arranged to provide multiple transmission paths for wireless signals within the waveguide.

When received by the plurality of receiving antennas, radio adapter 1332 is operative to resolve the first signal transmitted by first antenna 1340 and the second signal transmitted by second antenna 1350. Thus, the airspace with waveguide 1334 is multiplexed. Resolving the first and the second signals is based on at least a multiple path operator, such as a multiple path matrix. The multiple path operator is based on at least characteristics of the airspace within waveguide 1334. Such characteristics may include symmetrical and/or non-symmetrical features on an interior surface of the waveguide's cavity. For instance, features such as ridges, angles, shapes, folds, corrugations, or protuberances that are placed at symmetrical and/or non-symmetrical locations along the interior surface of the waveguide's channel may affect the multipath propagation of signals with waveguide 1334, and thus the multiple path operator. FIG. 15A shows corrugations along the internal surface of a waveguide affecting the multiple path prorogation of signals along a waveguide.

Figure 14:
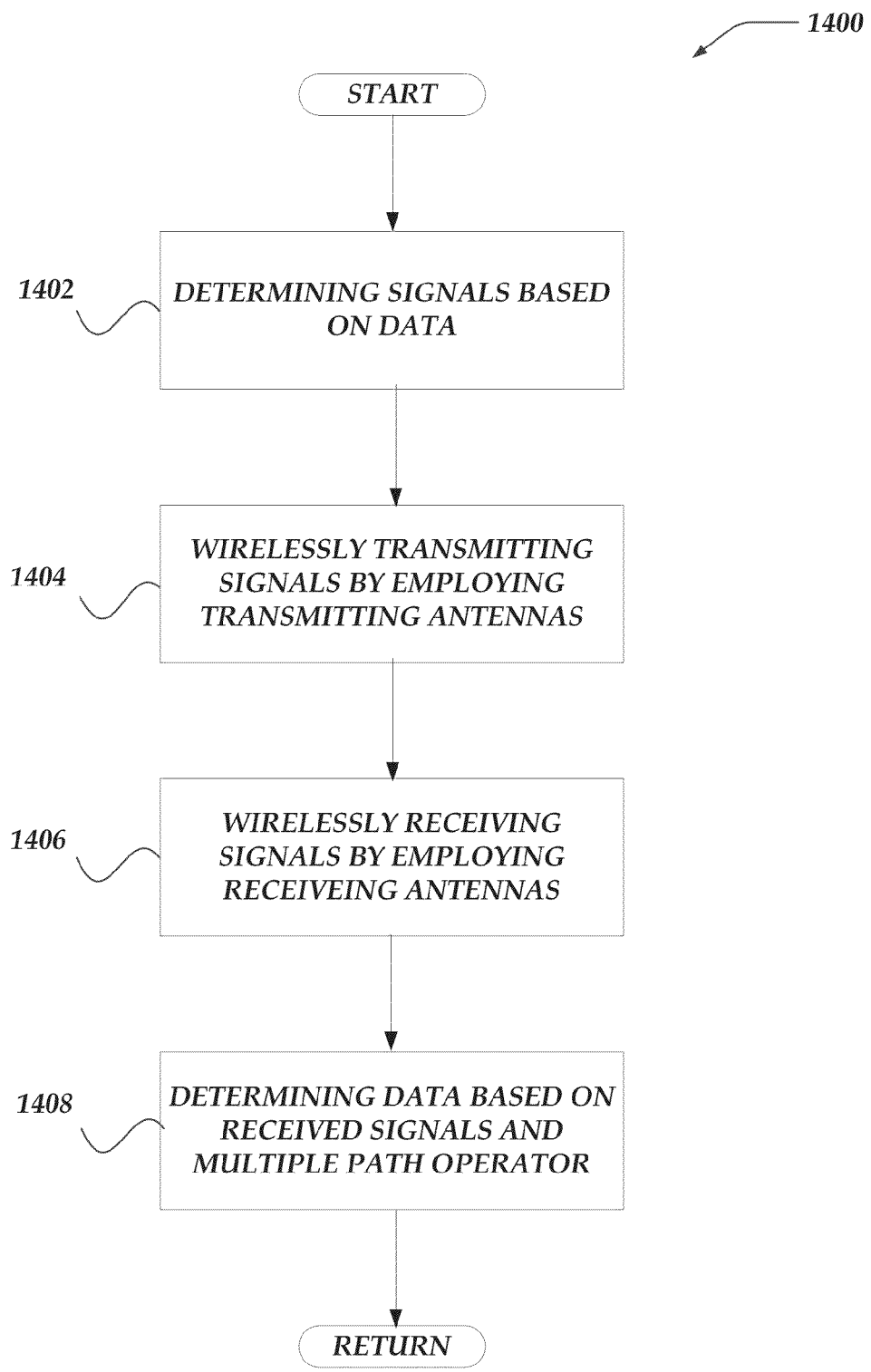
FIG. 14 illustrates a logical flow diagram generally showing an embodiment of a process for multiplexing an airspace within a volume of a chassis by employing a multipath propagation of wireless signals within a waveguide.

FIG. 14 illustrates a logical flow diagram generally showing an embodiment of a process for multiplexing an airspace within a volume of a chassis by employing a multipath propagation of wireless signals within a waveguide. Process 1400 may begin, after a start block, at block 1402, where a plurality of signals are determined based on data to be transmitted. Process 1400 proceeds to block 1404, where the plurality of signals are wirelessly transmitted by employing a plurality of transmitting antennas. For instance, the signals may be transmitted by a wireless controller or a radio adapter along a wireless waveguide.

At block 1406, the plurality of signals are wirelessly received by a plurality of receiving antennas. For example, the plurality of signals may be received by one or more wireless controllers or radio adapters that are electromagnetically coupled to the waveguide. At block 1408, the data is determined based on the wirelessly received plurality of signals. Determining the data is further based on a multiple path operator. The multiple path operator may be employed to resolve the received plurality of signals, where of the signals traveled along multiple paths within a waveguide, as shown in at least FIG. 13.

Figure 15B:
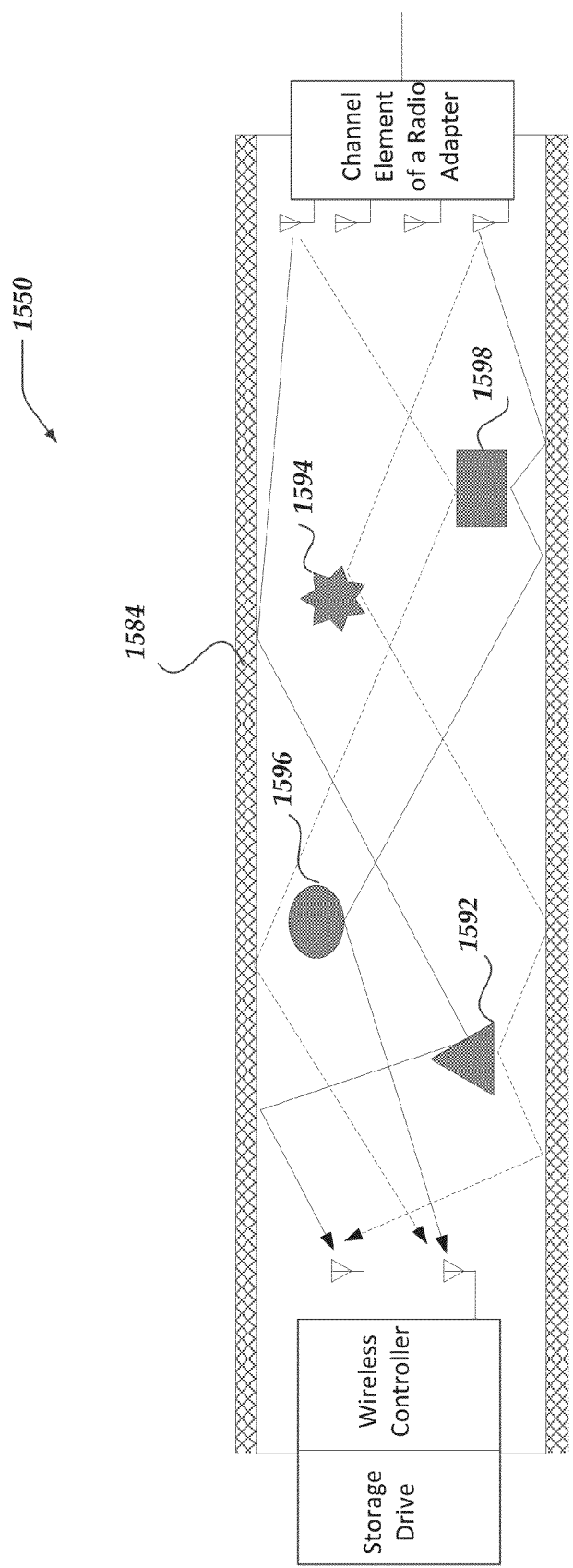
FIG. 15B illustrates structures disposed within an airspace of a waveguide which are configured and arranged to provide multiple transmission paths for wireless signals within the waveguide.

The multipath path operator is based on the multiple paths that the plurality of signals travel within the airspace of the waveguide. For instance, the multiple path operator may be based on the multiple paths each of the first wireless signal 1340 and second wireless signal 1350 travel between the first and second antennas 1340/1350 and the plurality of antennas of radio adapter 1332 of FIG. 13. Accordingly, as discussed above, the multipath operator may be based on one or more characteristics of the airspace within the internal cavity of the waveguide. Such characteristics may include uniform or non-uniform surfaces within the cavity. In at least one embodiment, as shown in FIG. 15B, the characteristics may include obstacles or wave reflectors within the airspace. Determining the data may be further based on noise introduced in the transmitting waveguide. Process 1400 may return to a calling process to perform other actions.

FIG. 15A illustrates corrugations along the internal surfaces of a waveguide which are configured and arranged to provide multiple transmission paths for wireless signals within the waveguide. Wireless chassis portion 1500 includes similar features to wireless chassis portion 1300 of FIG. 13, including a waveguide 1534. One or more internal surfaces of waveguide 1534 includes a plurality of corrugations 1540. As discussed throughout, and shown in FIG. 15A, such corrugation and other such structures affect the multiple path propagation of wireless signals along waveguide 1534. Accordingly, a multiple path operator, such as a multipath matrix, employed to resolve the multiple signals is based on the plurality of corrugations 1540 or other such structures. Corrugations 1540, or other structures, may provide enhances resolution of the multiple signals within a waveguide, when the airspace is multiplexed by a MIMO or MIMO-like process.

FIG. 15B illustrates structures disposed within an airspace of a waveguide which are configured and arranged to provide multiple transmission paths for wireless signals within the waveguide. Waveguide 1584 of wireless chassis portion 1550 includes a plurality of structures, obstructions, wave reflectors, or the like, including structures 192, 1594, 1596, and 1598. Various embodiments may include more or less such structures. As shown in FIG. 15B, the plurality of structures affect the multiple path propagation or transmission of a plurality of wireless signals within waveguide 1584. Accordingly, a multiple path operator, employed to resolve the multiple signals is based on the plurality of such structures. Such structures may provide enhances resolution of the multiple signals within a waveguide, when the airspace is multiplexed by a MIMO or MIMO-like process. Such structure may include any symmetric or non-symmetric cross-sectional shape. The structure may include electrically conductive surfaces, such that the signals are reflected from the surfaces. Note that, as shown in FIG. 15A, the plurality of radio adapter antennas are transmitting the multiple signals and the plurality of the wireless controller antennas are receiving the wireless signals. Each of the radio adapter antennas and each of the wireless controller antennas are operative to both receive and transmit wireless signals along multiple signal paths within waveguide 1584.

Exemplary Embodiment for Increasing a Bandwidth of a Wireless Data Storage Chassis As described above, the bandwidth of a wireless chassis may be increased my multiplexing at least one of a frequency space, an airspace, or a geometry of the chassis. As an exemplary, but non-limiting embodiment, for increasing the bandwidth of a wireless chassis, various features of the 802.11 ac protocols are employed and described below. The frequency space is multiplexed into 12 frequency channels, where each frequency channel is 40 MHz wide and a 400 ns guard interval separates adjacent frequency channels. Furthermore, a 256 bit Quadrature Amplitude Modulation (256-QAM) modulating scheme and a 5/6 error correction coding rate are employed. In in the context of the 802.11ac protocol, an MCS index of 9 is employed to enable the wireless communication. Each of the 12 channels has a bandwidth of 200 Mbits/s/antenna. Accordingly, the multiplexed frequency space has a bandwidth of 12×200 Mbits/s/antenna=2400 Mbits/s/antenna.

The geometry of the chassis is multiplexed by employing multiple waveguides and multiple radio adapters. For instance, a cavity within a waveguide may have a corresponding bandwidth of B (depending on the frequency multiplexing described above). When N devices are communicating along a single waveguide or waveguide portion, the total bandwidth is distributed among the devices, such that the bandwidth per device is B/N. However, if the N devices are distributed among M waveguides or waveguide portions (rather than a single waveguide), then the bandwidth per device is M*(B/N). Accordingly, the geometry of the wireless chassis is multiplexed by distributing the communication between the wireless controllers among multiple waveguides, wherein each waveguide is electromagnetically coupled to one or more radio adapters, as described throughout.

As also discussed throughout, the airspace within each of the multiple waveguides may be multiplexed by employing MIMO or MIMO-like techniques to further increase the bandwidth within the waveguide. The bandwidth may be dynamically allocated depending on the real time operating bandwidth requirements of the wireless chassis.

It will be understood that at least portions of the blocks of the flowchart illustrations, including at least FIGS. 11, 12A, 12B, and 14, and combinations of blocks in the flowchart illustrations, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustrations support combinations of means for performing the specified actions, combinations of steps for performing the specified actions and program instruction means for performing the specified actions. It will also be understood that each block of the flowchart illustrations, and combinations of blocks in the flowchart illustrations, can be implemented by special purpose hardware based systems, which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. An apparatus for storing a plurality of storage drives, wherein the plurality of storage drives are operative to communicate over a network, comprising:
    a housing, wherein hardware located inside the housing, includes:
        the plurality of storage drives, wherein each storage drive includes one or more wireless controllers having one or more wireless interfaces;
        one or more radio adapters that include one or more wireless interfaces and one or more external communication interfaces, wherein the one or more radio adapters perform one or more actions, comprising one or more of:
            multiplexing frequencies of wireless signals communicated in an airspace inside the housing between the one or more radio adapters and the one or more wireless controllers; or
            multiplexing wireless signals communicated between the one or more radio adapters and the one or more wireless controllers based on one or more characteristics of the airspace inside the housing; and
        one or more separate mechanical waveguides that are located along a length of the housing and are coupled to each of the wireless interfaces, wherein each waveguide includes one or more internal cavities for the airspace, wherein an internal cavity enables transmission of the one or more wireless signals, within the airspace of the internal cavity, between the one or more wireless controllers and the one or more wireless interfaces of the one or more radio adapters; and
        one or more remote communication interfaces that provide communication over the network with one or more remotely located network computers, wherein the one or more remote communication interfaces are in communication with the one or more external communication interfaces.

2. The apparatus of claim 1, further comprising:
    a first waveguide that is operative to guide transmission of the one or more wireless signals for a portion of the one or more wireless controllers and the one or more radio adapters; and
    a second waveguide that is operative to guide transmission of the one or more wireless signals between a separate portion of the one or more wireless controllers and the one or more radio adapters.

3. The apparatus of claim 1, wherein the one or more characteristics of the airspace is based on one or more non-uniform surfaces positioned within one or more of the internal cavities that correspond to the one or more waveguides.

4. The apparatus of claim 1, further comprising:
    a first waveguide that is operative to enable transmission of the one or more wireless signals, within a first airspace of the first waveguide, between a portion of the one or more wireless controllers and a first portion of the one or more radio adapters; and
    a second waveguide that is operative to enable transmission of the one or more wireless signals, within a second airspace of the second waveguide, between a separate portion of the one or more wireless controllers and a second separate portion for the one or more radio adapters.

5. The apparatus of claim 1, further comprising one or more of:
    two or more antennas for one or more of the wireless controllers, wherein the wireless controller antennas are operative to provide multipath communication of the one or more wireless signals; or
    two or more antennas for one or more of the radio adapters, wherein the radio adapter antennas are operative to provide multipath communication of the one or more wireless signals.

6. The apparatus of claim 1, further comprising a port in the one or more waveguides that is operative to provide access for two or more wireless controllers to the internal cavity of the one or more waveguides.

7. The apparatus of claim 1, further comprising one or more termination plates positioned within the airspace of the internal cavity.

8. The apparatus of claim 1, wherein the multiplexing of frequencies within a range corresponds to one or more of: an Institute of Electrical and Electronics Engineers (IEEE) 802.11ac protocol, an IEEE 802.11ad protocol, an IEEE 802.16 protocol, an IEEE 802.15.1 protocol, or an IEEE 802.15.4 protocol.

9. An apparatus for wirelessly communicating with a plurality of storage drives, wherein the plurality of storage drives are operative to communicate over a network, comprising:
    a radio adapter that includes one or more wireless interfaces and one or more external communication interfaces that are adapted for communication with one or more remote communication interfaces that provide communication over the network with one or more remotely located network computers, wherein the radio adapter and the plurality of storage drives are located inside a housing, and wherein the radio adapter performs one or more actions, comprising one or more of:
        multiplexing frequencies of wireless signals communicated in an airspace between the radio adapter and one or more wireless controllers, wherein each storage drive includes one or more wireless controllers having one or more wireless interfaces; or
        multiplexing wireless signals communicated between the radio adapter and the one or more wireless controllers based on one or more characteristics of the airspace; and
    wherein the radio adapter is adapted for positioning inside the housing that also includes one or more separate mechanical waveguides inside the housing that are located along a length of the housing and are coupled to each of the wireless interfaces, wherein each waveguide includes one or more internal cavities for the airspace, wherein an internal cavity enables transmission of the one or more wireless signals, within the airspace of the internal cavity, between the one or more wireless controllers and the one or more wireless interfaces of the radio adapter.

10. The apparatus of claim 9, wherein the housing further includes:
    a first waveguide that is operative to guide transmission of the one or more wireless signals for a portion of the one or more wireless controllers and the radio adapter; and a second waveguide that is operative to guide transmission of the one or more wireless signals between a separate portion of the one or more wireless controllers and the radio adapter.

11. The apparatus of claim 9, wherein the one or more characteristics of the airspace is based on one or more non-uniform surfaces positioned within one or more of the internal cavities that correspond to the one or more waveguides.

12. The apparatus of claim 9, wherein the housing further includes:
- a first waveguide that is operative to enable transmission of the one or more wireless signals, within a first airspace of the first waveguide, between a portion of the one or more wireless controllers and the radio adapter; and
- a second waveguide that is operative to enable transmission of the one or more wireless signals, within a second airspace of the second waveguide, between a separate portion of the one or more wireless controllers and the radio adapter.

13. The apparatus of claim 9, wherein the housing further includes one or more of:
- two or more antennas for one or more of the wireless controllers, wherein the wireless controller antennas are operative to provide multipath communication of the one or more wireless signals; or
- two or more antennas for the radio adapter, wherein the radio adapter antennas are operative to provide multipath communication of the one or more wireless signals.

14. The apparatus of claim 9, wherein the housing further includes a port in the one or more waveguides that is operative to provide access for two or more wireless controllers to the internal cavity of the one or more waveguides.

15. The apparatus of claim 9, wherein the housing further includes one or more termination plates positioned within the airspace of the internal cavity.

16. The apparatus of claim 9, wherein the multiplexing of frequencies within a range corresponds to one or more of: an Institute of Electrical and Electronics Engineers (IEEE) 802.11ac protocol, an IEEE 802.11ad protocol, an IEEE 802.16 protocol, an IEEE 802.15.1 protocol, or an IEEE 802.15.4 protocol.

17. A method for wirelessly communicating with a plurality of storage drives, wherein the plurality of storage drives are operative to communicate over a network, comprising:
- employing one or more radio adapters that include one or more wireless interfaces and one or more external communication interfaces to communicate with one or more remote communication interfaces that provide communication over the network with one or more remotely located network computers, wherein the radio adapters and the plurality of storage drives are located inside a housing, and wherein the one or more radio adapters perform one or more actions, comprising one or more of:
  - multiplexing frequencies of wireless signals communicated in an airspace between the one or more radio adapters and one or more wireless controllers, wherein each storage drive includes one or more wireless controllers having one or more wireless interfaces; or
  - multiplexing wireless signals communicated between the one or more radio adapters and the one or more wireless controllers based on one or more characteristics of the airspace; and
- wherein the radio adapter is adapted for positioning inside the housing that also includes one or more separate mechanical waveguides inside the housing that are located along a length of the housing and are coupled to each of the wireless interfaces, wherein each waveguide includes one or more internal cavities for the airspace, wherein an internal cavity enables transmission of the one or more wireless signals, within the airspace of the internal cavity, between the one or more wireless controllers and the one or more wireless interfaces of the radio adapter.

18. The method of claim 17, wherein the housing further includes:
- a first waveguide that is operative to guide transmission of the one or more wireless signals for a portion of the one or more wireless controllers and the one or more radio adapters; and
- a second waveguide that is operative to guide transmission of the one or more wireless signals between a separate portion of the one or more wireless controllers and the one or more radio adapters.

19. The method of claim 17, wherein the one or more characteristics of the airspace is based on one or more non-uniform surfaces positioned within one or more of the internal cavities that correspond to the one or more waveguides.

20. The method of claim 17, wherein the housing further includes:
- a first waveguide that is operative to enable transmission of the one or more wireless signals, within a first airspace of the first waveguide, between a portion of the one or more wireless controllers and a first portion of the one or more radio adapters; and
- a second waveguide that is operative to enable transmission of the one or more wireless signals, within a second airspace of the second waveguide, between a separate portion of the one or more wireless controllers and a second separate portion for the one or more radio adapters.

21. The method of claim 17, wherein the housing further includes one or more of:
- two or more antennas for one or more of the wireless controllers, wherein the wireless controller antennas are operative to provide multipath communication of the one or more wireless signals; or
- two or more antennas for one or more of the radio adapters, wherein the radio adapter antennas are operative to provide multipath communication of the one or more wireless signals.

22. The method of claim 17, wherein the housing further includes a port in the one or more waveguides that is operative to provide access for two or more wireless controllers to the internal cavity of the one or more waveguides.

23. The method of claim 17, wherein the housing further includes one or more termination plates positioned within the airspace of the internal cavity.

24. The method of claim 17, wherein the multiplexing of frequencies within a range corresponds to one or more of: an Institute of Electrical and Electronics Engineers (IEEE) 802.11ac protocol, an IEEE 802.11ad protocol, an IEEE 802.16 protocol, an IEEE 802.15.1 protocol, or an IEEE 802.15.4 protocol.

25. A computer readable non-transitive storage media that includes instructions for wirelessly communicating with a plurality of storage drives, wherein the execution by a hardware processor of the instructions performs actions, comprising:
- employing one or more radio adapters that include one or more wireless interfaces and one or more external communication interfaces to communicate with one or more remote communication interfaces that provide communication over a network with one or more remotely located network computers, wherein the one or more radio adapters and the plurality of storage drives are inside a housing, and wherein the one or more radio adapters perform one or more further actions, comprising one or more of:
- multiplexing frequencies of wireless signals communicated in an airspace between the one or more radio adapters and one or more wireless controllers, wherein each storage drive includes one or more wireless controllers having one or more wireless interfaces; or
- multiplexing wireless signals communicated between the one or more radio adapters and the one or more wireless controllers based on one or more characteristics of the airspace; and wherein the radio adapter is adapted for positioning inside the housing that also includes one or more separate mechanical waveguides inside the housing that are located along a length of the housing and are coupled to each of the wireless interfaces, wherein each waveguide includes one or more internal cavities for the airspace, wherein an internal cavity enables transmission of the one or more wireless signals, within the airspace of the internal cavity, between the one or more wireless controllers and the one or more wireless interfaces of the radio adapter.

26. The media of claim 25, wherein the multiplexing of frequencies within a range corresponds to one or more of: an Institute of Electrical and Electronics Engineers (IEEE) 802.11ac protocol, an IEEE 802.11ad protocol, an IEEE 802.16 protocol, an IEEE 802.15.1 protocol, or an IEEE 802.15.4 protocol.

* * * * *